US012477259B2

(12) United States Patent
Lu et al.

(10) Patent No.: US 12,477,259 B2
(45) Date of Patent: *Nov. 18, 2025

(54) MICROPHONE

(71) Applicant: GUANGDONG DINGCHUANG SMART MANUFACTURING CO., LTD., Guangdong (CN)

(72) Inventors: Jun Lu, Guangdong (CN); Shangjing Li, Guangdong (CN); Weirong Li, Guangdong (CN); Hong Zhou, Guangdong (CN)

(73) Assignee: GUANGDONG DINGCHUANG SMART MANUFACTURING CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/194,953

(22) Filed: Apr. 30, 2025

(65) Prior Publication Data

US 2025/0260920 A1 Aug. 14, 2025

Related U.S. Application Data

(63) Continuation-in-part of application No. 18/825,047, filed on Sep. 5, 2024, now Pat. No. 12,309,540.

(30) Foreign Application Priority Data

Nov. 20, 2023 (CN) ........................ 202323133044.5

(51) Int. Cl.
*H04R 1/04* (2006.01)
*F21V 3/06* (2018.01)
(Continued)

(52) U.S. Cl.
CPC ............ *H04R 1/028* (2013.01); *F21V 3/062* (2018.02); *F21V 33/0056* (2013.01); *H04R 1/04* (2013.01); *H04R 1/086* (2013.01); *F21V 2200/20* (2015.01); *F21Y 2115/10* (2016.08); *H04R 2420/09* (2013.01); *H04R 2430/01* (2013.01)

(58) Field of Classification Search
CPC .......... H04R 1/028; H04R 1/04; H04R 1/086; H04R 2420/09
See application file for complete search history.

(56) References Cited

U.S. PATENT DOCUMENTS 11,946,631 B2 * 4/2024 Xu .......................... F21V 29/83
2007/0109763 A1 * 5/2007 Wolf .................. A01M 1/2083 362/276
2014/0285999 A1 * 9/2014 Luna ...................... F21V 13/02 362/95

* cited by examiner

*Primary Examiner* — Suhan Ni
(74) *Attorney, Agent, or Firm* — HOWARD M COHN and Associates, LLC

(57) ABSTRACT

A microphone includes a shell assembly, a sound pickup assembly, a control assembly and a light-emitting assembly. The shell assembly includes a shell body with a first accommodating chamber. The sound pickup assembly includes a microphone head for sound pickup, wherein the microphone head is arranged on the shell assembly. The control assembly includes a first circuit board. The first circuit board is arranged in the first accommodating chamber, and is electrically connected to the microphone head. The light-emitting assembly includes a light-emitting unit. The light-emitting unit is arranged in the first accommodating chamber and is electrically connected to the first circuit board. The light-emitting unit is configured to allow emitted light to pass through a portion of the shell body.

19 Claims, 26 Drawing Sheets

(51) Int. Cl.

| | |
|---|---|
| ***F21V 33/00*** | (2006.01) |
| ***H04R 1/02*** | (2006.01) |
| ***H04R 1/08*** | (2006.01) |
| *F21Y 115/10* | (2016.01) |

MICROPHONE

CROSS-REFERENCE TO RELATED APPLICATIONS

This application is a Continuation-in-Part of the U.S. application Ser. No. 18/825,047 filed on Sep. 5, 2024, and entitled "MICROPHONE" now pending, which claims priority to Chinese Patent Application CN202323133044.5, filed on Nov. 20, 2023, the entire disclosures of which are incorporated herein by reference.

TECHNICAL FIELD

The present disclosure relates to the technical field of microphones, and in particular, to a luminous microphone.

BACKGROUND

The application for microphones can be traced back to the late 19th century. Scientists were dedicated to finding better ways to pick up sounds to improve applications such as telephones. With the emergence of ribbon microphones in the 1920s, there are more and more styles of microphones over time, and their functions have become more diverse. Improving the user experience of microphones and creating an optimal sound pickup environment remain a significant technical challenge in the industry.

SUMMARY

In the first aspect, the present invention provides a microphone.

A microphone includes a shell assembly, a sound pickup assembly, a control assembly and a light-emitting assembly. The shell assembly includes a shell body with a first accommodating chamber. The sound pickup assembly includes a microphone head for sound pickup, wherein the microphone head is arranged on the shell assembly. The control assembly includes a first circuit board. The first circuit board is arranged in the first accommodating chamber, and is electrically connected to the microphone head. The light-emitting assembly includes a light-emitting unit. The light-emitting unit is arranged in the first accommodating chamber and is electrically connected to the first circuit board. The light-emitting unit is configured to allow emitted light to pass through a portion of the shell body.

In one embodiment, the shell body includes an outer shell having a circumferentially arranged sidewall structure and a bottom plate connected to one end of the sidewall structure; the first accommodating chamber is enclosed by the sidewall structure; at least one of the sidewall structure and the bottom plate has light transmittance, and is configured to allow light emitted by the light-emitting unit to pass through either the sidewall structure or the bottom plate.

In one embodiment, the bottom plate includes a main body portion and a connecting portion; the connecting portion is connected to an outer side of the main body portion and is connected to the outer shell; the connecting portion has light transmittance, and is configured to allow the light emitted by the light-emitting unit to pass through the connecting portion.

In one embodiment, the main body portion has light-shielding properties or the shell assembly further includes a light shielding member; the light shielding member is arranged on the main body portion, and the light shielding member is configured to shield the light emitted by the light-emitting unit from being transmitted to outside through the main body portion.

In one embodiment, the connecting portion includes an annular light-transmitting structure, and is configured to allow the light emitted by the light-emitting unit to pass through the connecting portion and form an annular light-emitting strip.

In one embodiment, the shell assembly further includes an inner shell arranged in the first accommodating chamber and connected to the outer shell; the inner shell is a hollow cylindrical structure configured to abut against the outer shell to reinforce support strength of the outer shell; the inner shell has light-shielding properties.

In one embodiment, the shell assembly further includes a cover plate connected to one side of the outer shell away from the bottom plate, and the cover plate has light-shielding properties.

In one embodiment, the bottom plate has light-shielding properties; the outer shell has light transmittance, and is configured to allow the light emitted by the light-emitting unit to pass through the outer shell and allow the sidewall structure to emit light overall.

In one embodiment, the shell assembly further includes an inner shell arranged in the first accommodating chamber; the inner shell is provided with a second accommodating chamber; and the first circuit board is arranged in the second accommodating chamber; the inner shell has light transmittance; the light-emitting unit is arranged in the second accommodating chamber; and the light-emitting unit is configured to allow emitted light to sequentially pass through the inner shell and the outer shell.

In one embodiment, an interval space is provided between the inner shell and the outer shell; the light-emitting unit is arranged in the inner shell or the interval space; the inner shell is a semi-transparent shell.

In one embodiment, the light-emitting assembly includes a second circuit board, the light-emitting unit is electrically connected to the second circuit board, and the second circuit board is electrically connected to the first circuit board; the second circuit board is arranged in the first accommodating chamber adjacent to the bottom plate, and the second circuit board is arranged in parallel with the bottom plate; the light-emitting unit is arranged on a surface of the second circuit board facing the bottom plate, and is configured to emit light toward the connecting portion.

In one embodiment, the light-emitting assembly further includes an indicator lamp, the indicator lamp is electrically connected to the second circuit board, and the indicator lamp is configured to allow emitted light to pass through the outer shell; the light-emitting assembly further includes a light guide member, the outer shell is provided with a through hole, a portion of the light guide member is arranged in the through hole, the indicator lamp is arranged on a surface of the second circuit board facing the microphone head, the light guide member is arranged adjacent to the indicator lamp, and the light guide member is configured to transmit the light emitted by the indicator lamp to outside of the outer shell.

In one embodiment, the control assembly further includes a function key; the function key is configured to pass through the outer shell, is electrically connected to the first circuit board, and is disposed on a same side of the outer shell as the through hole; the function key is configured to adjust a signal amplification level input to the microphone and/or a signal strength output by the microphone, and/or to enable or disable a mute function of the microphone.

In one embodiment, the shell assembly further includes a mounting frame and a balancing weight; a longitudinal direction of the mounting frame is consistent with a longitudinal direction of the microphone; the mounting frame is arranged in the first accommodating chamber; the balancing weight and the first circuit board are arranged on opposite sides of the mounting frame; the balancing weight is configured to balance a weight of the shell assembly for adjusting a center of gravity of the microphone.

In one embodiment, the microphone further includes a base and a supporting assembly; the supporting assembly includes a support; one end of the support is connected to the base; the shell body is configured to be rotatably connected to one end of the support away from the base, thereby enabling the shell assembly to rotate the sound pickup assembly relative to the base for adjusting a sound pickup angle.

In one embodiment, one end of the support away from the base is rotatably connected to a side surface of the shell assembly.

In one embodiment, one end of the support away from the base is rotatably connected to one end of the sidewall structure away from the bottom plate.

In one embodiment, the microphone further includes a shell compensation structure, the shell compensation structure is arranged on the shell assembly, and the shell compensation structure is configured to reinforce strength of the shell assembly; the supporting assembly further includes a rotating shaft, the rotating shaft is arranged at one end of the support away from the base; the outer shell is provided with a mounting hole communicating with the first accommodating chamber, the rotating shaft is arranged in the mounting hole in a penetrating manner, the outer shell is configured to be rotatably connected to the rotating shaft; the shell compensation structure includes a protrusion; and the protrusion is annularly arranged at the mounting hole and is connected to the outer shell; the supporting assembly further includes a first gasket with a through hole, the first gasket is arranged between the outer shell and the support, the rotating shaft is arranged in the through hole in a penetrating manner; the first gasket includes a first portion and a second portion, a portion adjacent to the base is defined as a second portion, and a thickness of the second portion is greater than a thickness of the first portion.

In one embodiment, the support includes a first connecting section, a second connecting section, and a third connecting section; the first connecting section is parallel to the third connecting section, the second connecting section is connected to the first connecting section and the third connecting section and forms a certain angle with the first connecting section and the third connecting section; one end of the first connecting section away from the second connecting section is connected to the base, and one end of the third connecting section away from the second connecting section is configured to be rotatably connected to the shell assembly; the first connecting section is connected to the base.

In one embodiment, the support includes a U-shaped support or a V-shaped support; both ends of the U-shaped support or the V-shaped support are configured to be rotatably connected to the shell assembly, and a bottom of the U-shaped support or the V-shaped support is configured to be connected to the base to support the microphone on an external object.

Compared with the prior art, the microphone provided in the present disclosure employs the light-emitting unit to transmit the emitted light through the bottom plate to the outside of the shell assembly, thereby enabling the microphone to produce colorful lighting effects during use. This configuration not only enhances the functionality of the microphone but also allows users to enjoy both auditory and visual effects simultaneously, which significantly improves the product's entertainment value. Additionally, the provision of the connecting bracket facilitates the rotation of the shell assembly, enabling users to adjust the angle and enabling multi-scenario use.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

Figure 1:
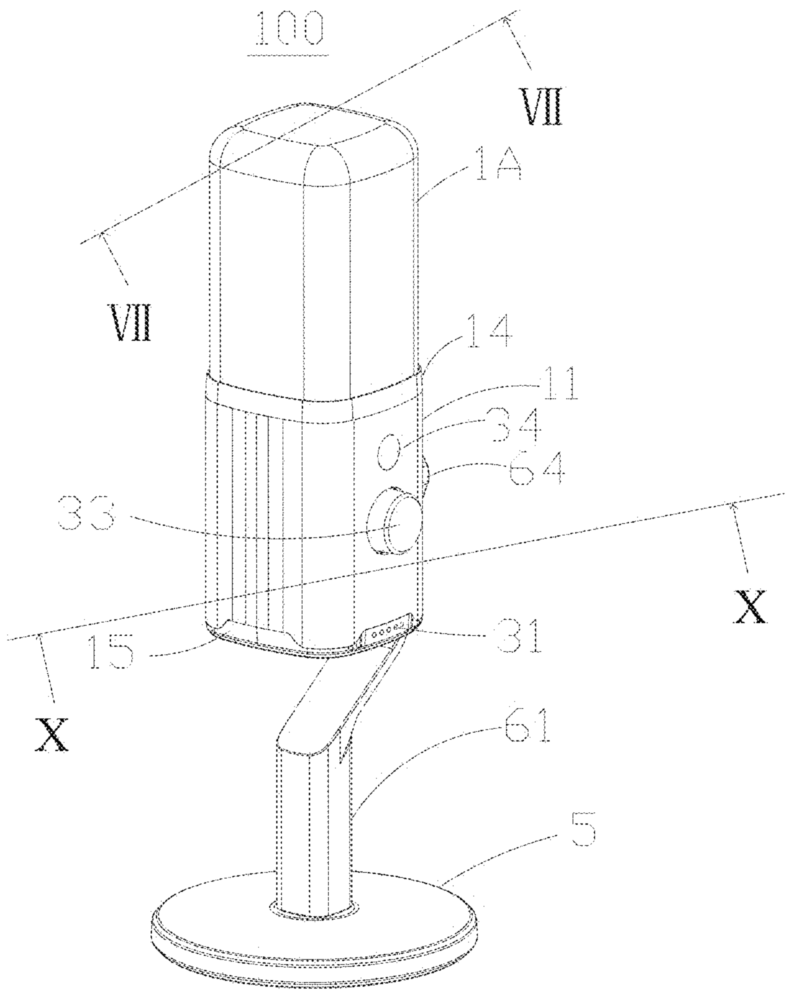
FIG. 1 is a three-dimensional diagram of a microphone according to a first embodiment of this application.

In order to facilitate understanding the present disclosure, the present disclosure will be described more comprehensively below with reference to related accompanying drawings. Preferred implementations of the present disclosure are provided in the drawings. However, the present disclosure can be implemented in many different forms, and are not limited to the implementations described herein. On the contrary, these implementations are provided to make the content disclosed in the present disclosure understood more thoroughly and comprehensively.

It should be noted that when an element is referred to as being "fixed to" another element, the element can be directly on another component or there can be a centered element. When an element is considered to be "connected" to another element, the element can be directly connected to another element or there may be a centered element. The terms "inner", "outer", "left", "right", and similar expressions used herein are for illustrative purposes only and do not necessarily represent the only implementation.

Unless otherwise defined, all technical and scientific terms used herein have the same meaning as those commonly understood by a person skilled in the art to which the present disclosure belongs. Terms used in the specification of the present disclosure herein are merely intended to describe objectives of the specific embodiments, but are not intended to limit the present disclosure. The term "and/or" used herein includes any and all combinations of one or more related listed items.

Figure 2:
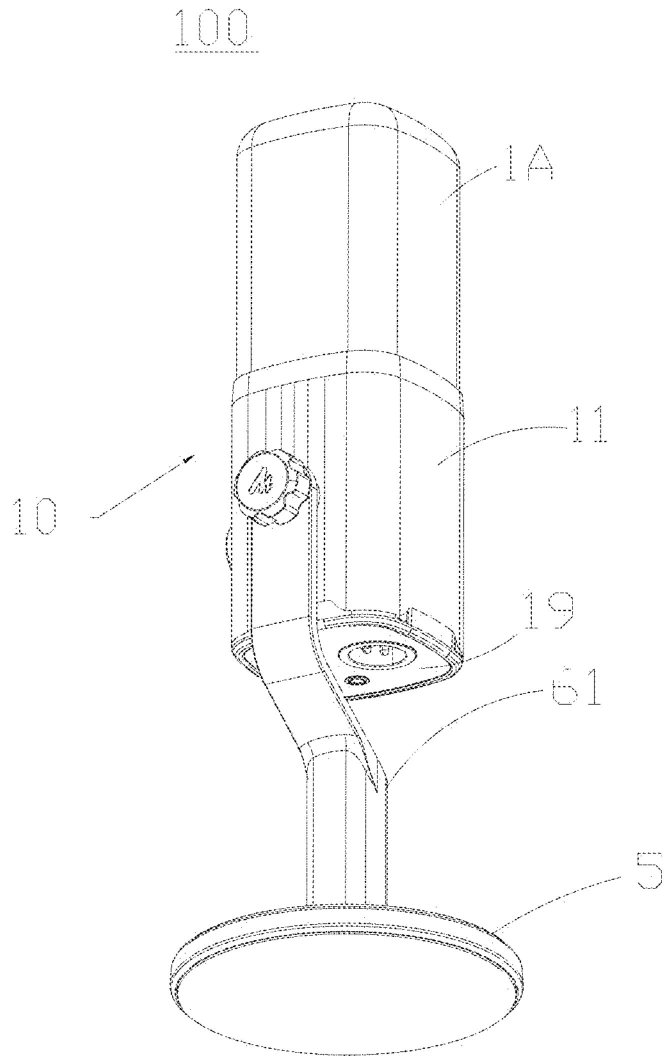
FIG. 2 is a three-dimensional diagram of a microphone in another angle according to a first embodiment of this application.
Figure 3:
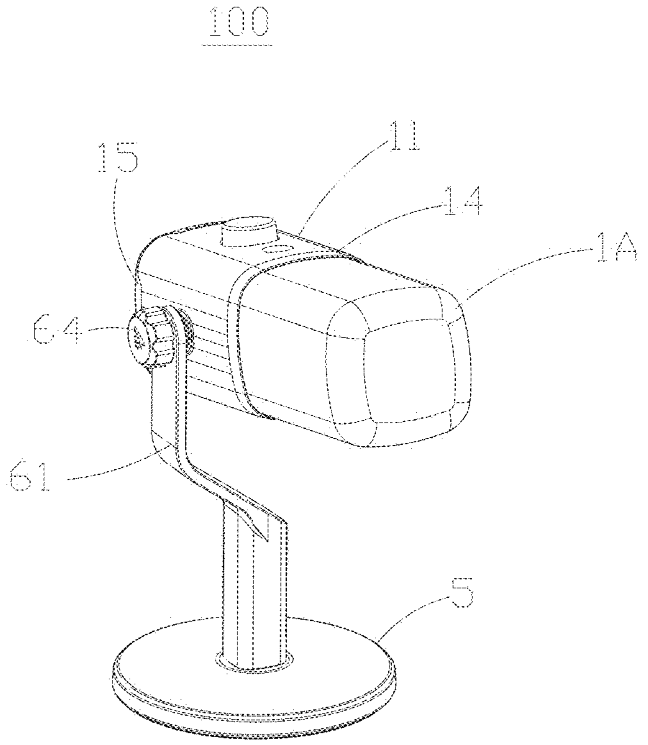
FIG. 3 is a three-dimensional diagram of a microphone in a usage state according to a first embodiment of this application.

Referring to FIG. 1, FIG. 2, and FIG. 3, FIG. 1 and FIG. 2 are three-dimensional diagrams of a microphone 100 according to an embodiment of the present disclosure in two different angles. When not in use, the microphone 100 can be rotated to a state shown in FIG. 1 or FIG. 2 for convenient storage and carrying. FIG. 3 is a three-dimensional diagram of a usage state of a microphone 100 according to an embodiment of the present disclosure. When using the microphone 100, a user will rotate and adjust the microphone 100 to a proper angle for better sound pickup, such as a usage state shown in FIG. 3, which is only a schematic diagram of a rotation angle. The microphone 100 disclosed in the present disclosure can be rotated according to a need of the user and maintained in different angles. The present disclosure will not show and elaborate them one by one again.

Figure 4:
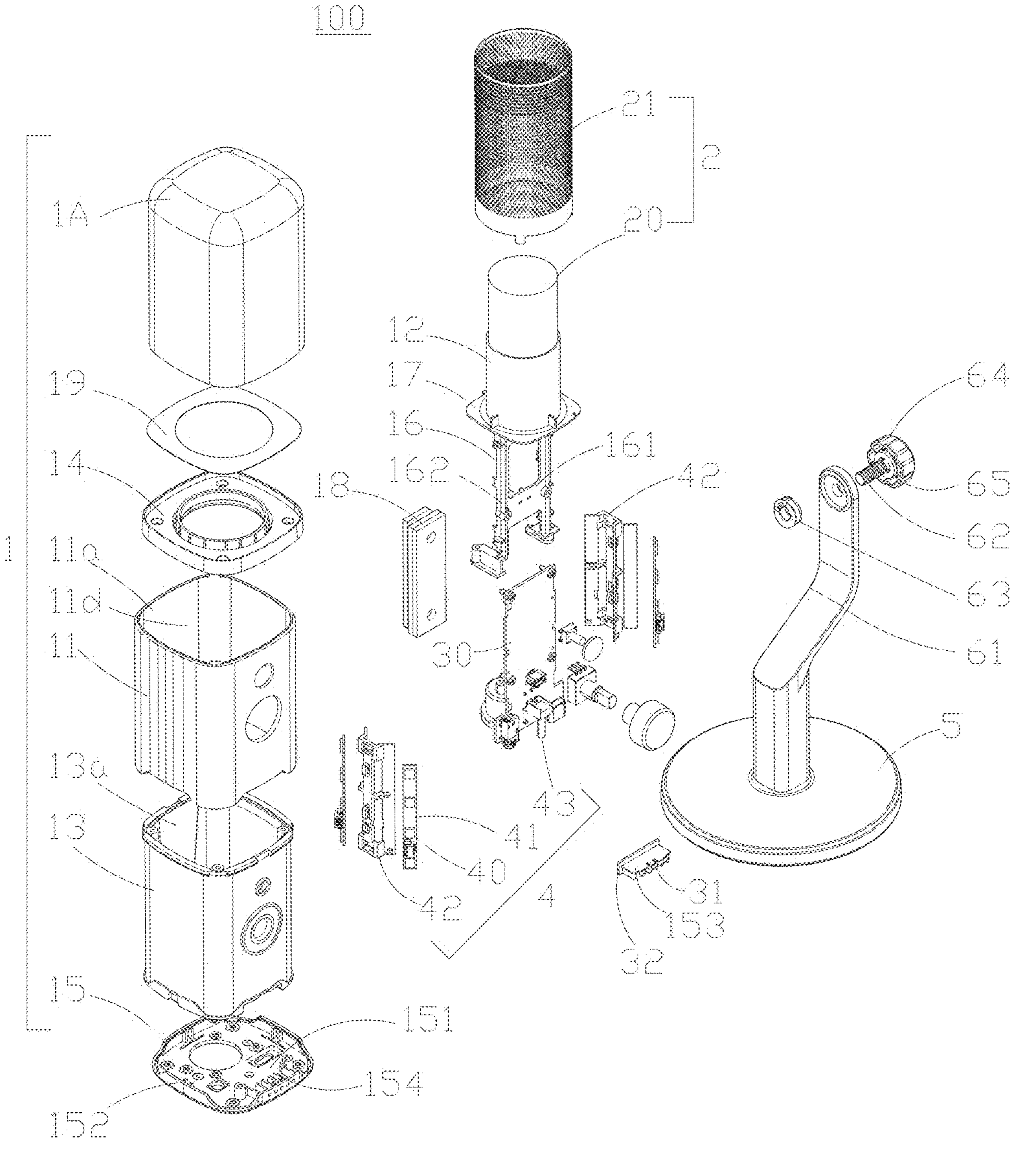
FIG. 4 is an exploded diagram of a microphone according to a first embodiment of this application.
Figure 5:
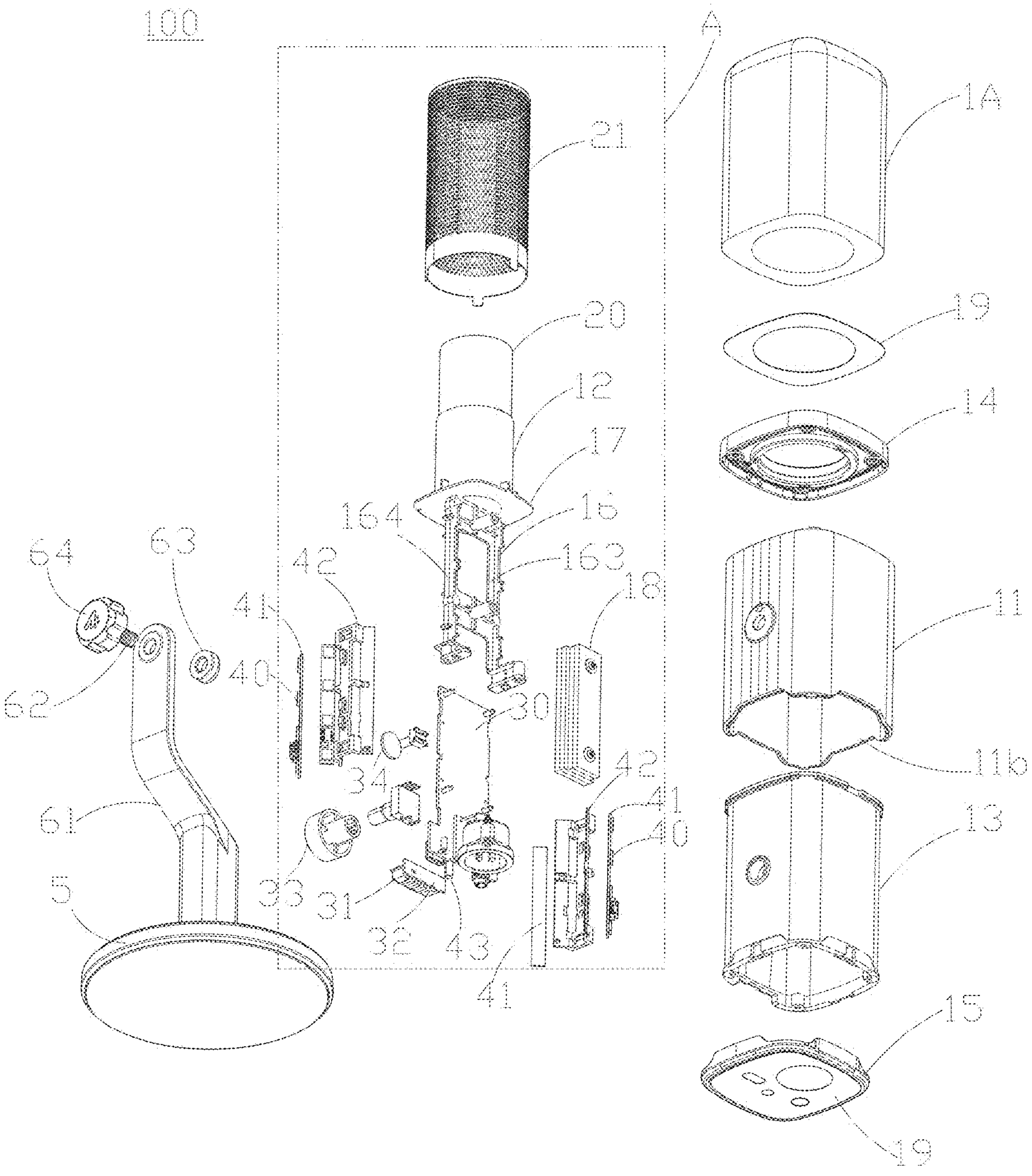
FIG. 5 is an exploded diagram of a microphone in another angle according to a first embodiment of this application.

Referring to FIG. 4 and FIG. 5, the microphone 100 according to an embodiment of the present disclosure includes a shell assembly 1, a sound pickup assembly 2, a control assembly 3, and a light-emitting assembly 4. The shell assembly 1 includes a shell body 10 with a first accommodating chamber 11*d* and a mounting seat 12. The mounting seat 12 is connected to the shell body 10, and at least a portion of the shell body 10 has light transmittance. The sound pickup assembly 2 includes a microphone head 20 for sound pickup. The microphone head 20 is mounted at the mounting seat 12. The control assembly 3 includes a first circuit board 30. The first circuit board 30 is arranged in the first accommodating chamber 11*d* and is electrically connected to the microphone head 20. The light-emitting assembly 4 includes a light-emitting unit 40. The light-emitting unit 40 is arranged in the first accommodating chamber 11*d* and is electrically connected to the first circuit board 30. The light-emitting unit 40 is configured to allow emitted light to pass through at lease a portion of the shell body 10. In this embodiment, the shell body 10 includes an outer shell 11 having a circumferentially arranged sidewall structure and a bottom plate 15 connected to one end of the sidewall structure.

In the microphone product, a shell occupies a large area of the product. According to the microphone 100 provided in the present disclosure, the transparent outer shell 11 is used, and the light-emitting unit 40 is arranged in the first accommodating chamber 11*d*, so that light emitted by the light-emitting unit 40 can be transmitted through the outer shell 11. Therefore, during pickup transmission of the microphone 100, a user or another person can observe a large-area lighting effect achieved by the microphone 100, thereby creating a more intense and cooler lighting atmosphere, achieving an effect of foiling the atmosphere and attracting the attention of people, and enhancing the user experience.

The light-transmittance intensity of the outer shell 11 provided in the embodiments of the present disclosure is flexible. The outer shell may have full light transmittance, or may have high-intensity light transmittance or low-intensity light transmittance. The outer shell 11 can be made of different materials according to an intensity requirement for the light transmittance, so that the shell assembly 1 presents preset light transmittance. The shell assembly 1 may preset the preset light transmittance by coating an outer side wall or an inner side wall of the outer shell 11 or performing surface sanding on the outer shell 11.

The shell assembly 1 may alternatively present the preset light transmittance by embedding a semi-transparent photomask into the outer shell 11. For example, in this embodiment, the shell assembly 1 further includes an inner shell 13 arranged in the first accommodating chamber 11*d*. The inner shell 13 has light transmittance. Light emitted by the light-emitting unit 40 passes through the inner shell 13 and the outer shell 11 in sequence. Specifically, the outer shell 11 is a transparent shell, and the inner shell 13 is a semi-transparent shell. In this embodiment, to improve the lighting effect displayed by the outer shell 11, the inner shell 13 also has a light filtering property, which can filter out a portion of the light and selectively transmit the emitted light to the outside. Transmitting light waves that a user can accept or like achieves a better result. The semi-transparent shell means that the inner shell 13 allows an amount of light to pass through, but this light is not enough to clearly display objects or details behind.

By the arrangement of the transparent outer shell 11, the light emitted by the light-emitting unit 40 in the microphone 100 can well pass through the transparent outer shell 11 without excessive loss, thereby achieving a better lighting effect. Meanwhile, the semi-transparent inner shell 13 is arranged inside the transparent outer shell 11, so that the light emitted by the light-emitting unit 40 passes through the semi-transparent inner shell 13 and then is transmitted through the transparent outer shell 11, making the light emitted to the outside of the microphone 100 softer. The design of the semi-transparent inner shell 13 can further cover internal components of the microphone 100, such as a circuit boards and wires, playing an aesthetic role. In addition, as the light-emitting unit 40 is arranged in the first accommodating chamber, the brightness of the light near the light-emitting unit 40 is stronger, which makes it easy to see components such as the circuit board and the wires around the light-emitting unit 40. During viewing through the outer shell 11, shadows of the internal components such as the circuit board and the wires will be displayed on the outer shell 11. The arrangement of the semi-transparent inner shell 13 can avoid this situation, so that the overall appearance of the product is more beautiful. Furthermore, the lighting effect of the product is cooler when the light-emitting unit 40 emits light. Furthermore, the light-emitting unit 40 is configured to emit light and/or flash when the microphone head 20 is picking up sound, such as by emitting and/or flashing according to volume or timbre of the collected sound signal, thereby enhancing the atmosphere during the use of the microphone. In some embodiments, the first circuit board 30 may receive the sound signal collected by the microphone head 20 and control the light emission of the light-emitting unit 40 based on the sound signal collected by the microphone head 20.

Figure 9:
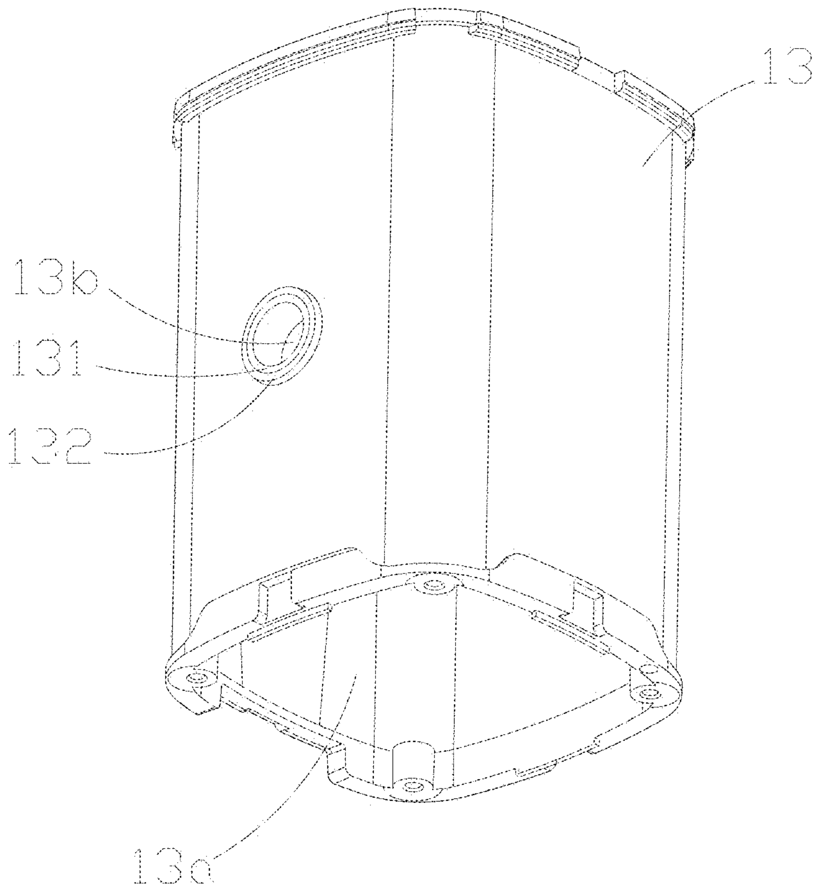
FIG. 9 is a three-dimensional diagram of an inner shell of the microphone shown in FIG. 1.

Referring to FIG. 4 and FIG. 9, in this embodiment, the inner shell 13 is provided with a second accommodating chamber 13*a*, and the light-emitting unit 40 is arranged in the second accommodating chamber 13*a*. The outer shell 11 is made of a transparent material, such as glass, an organic polymer light-transmittance material (an acrylic lamp), a light-transmittance composite material, and light-transmittance plastic as long as the outer shell 11 is transparent. The inner shell 13 is made of a semi-transparent material, such as a thermoplastic polymer, polymethyl methacrylate, polyethylene, polypropylene, polyester, polyvinyl chloride, polyamide, cellulose acetate, polyvinyl chloride, polystyrene, and polytetrafluoroethylene as long as the inner shell 13 is transparent.

Figure 8:
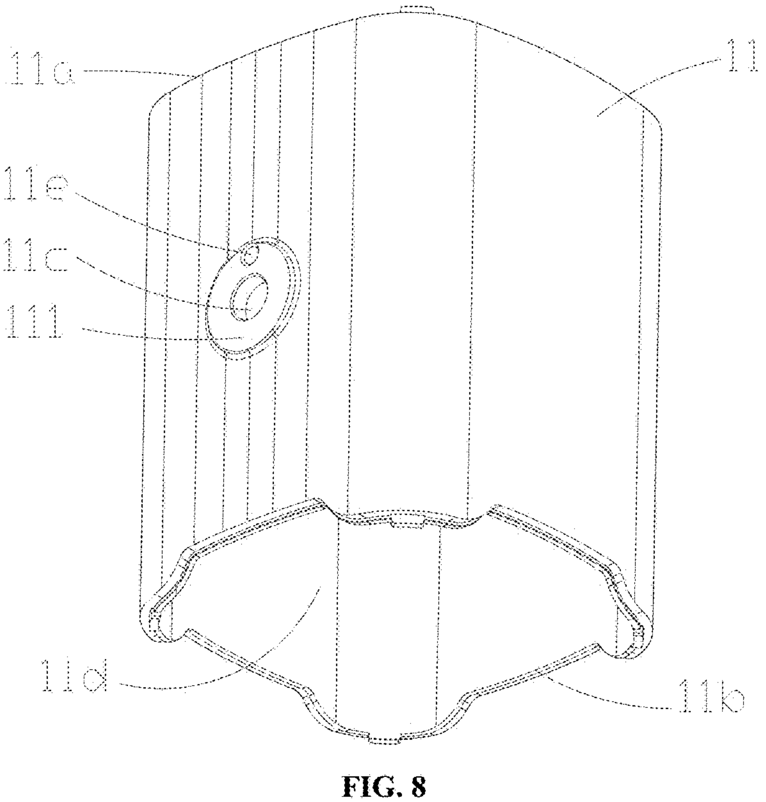
FIG. 8 is a three-dimensional diagram of an outer shell of the microphone shown in FIG. 1.

Referring to FIG. 4, FIG. 5, and FIG. 8, the outer shell 11 includes a first opening 11*a* and a second opening 11*b* which are communicated to the first accommodating chamber 11*d* and are opposite to each other. The second opening 11*b* is located at one end of the outer shell 11 away from the mounting seat 12. The shell assembly 1 further includes a cover plate 14 covering the first opening 11*a* and a bottom plate 15 covering the second opening 11*b*. The cover plate 14 connects the outer shell 11 to the mounting seat 12, and the outer shell 11 and the mounting seat 12 are arranged on opposite sides of the cover plate 14. The cover plate 14 does not have light transmittance. The bottom plate 15 does not have light transmittance. In this embodiment, the cover plate 14 and the bottom plate 15 are respectively arranged at two ends of the outer shell 11. The cover plate 14, the bottom plate 15, and the outer shell 11 are enclosed to form the first accommodating chamber 11*d*. The cover plate 14, the bottom plate 15, and the inner shell 13 are enclosed to form the second accommodating chamber 13*a*. The second accommodating chamber 13*a* is located in the first accommodating chamber 11*d*. An outer diameter of the inner shell 13 is less than an inner diameter of the outer shell 11, and the shape and structure of the inner shell 13 are similar to those of the outer shell 11, and they are barrel-shaped structures with openings in two ends. A spatial distance can be provided between the inner shell 13 and the outer shell 11, or the inner shell and the outer shell resist against each other or in other connection ways. For example, portions of the shells resist against each other, and a partial space is provided. In the embodiments of the present disclosure, a certain spatial distance is provided between the inner shell 13 and the outer shell 11. Specifically, the shells of the inner shell 13 and the outer shell 11 are arranged in parallel, and a side wall of the first accommodating chamber 11*d* and a side wall of the second accommodating chamber 13*a* are arranged in parallel, with a distance.

Figure 10:
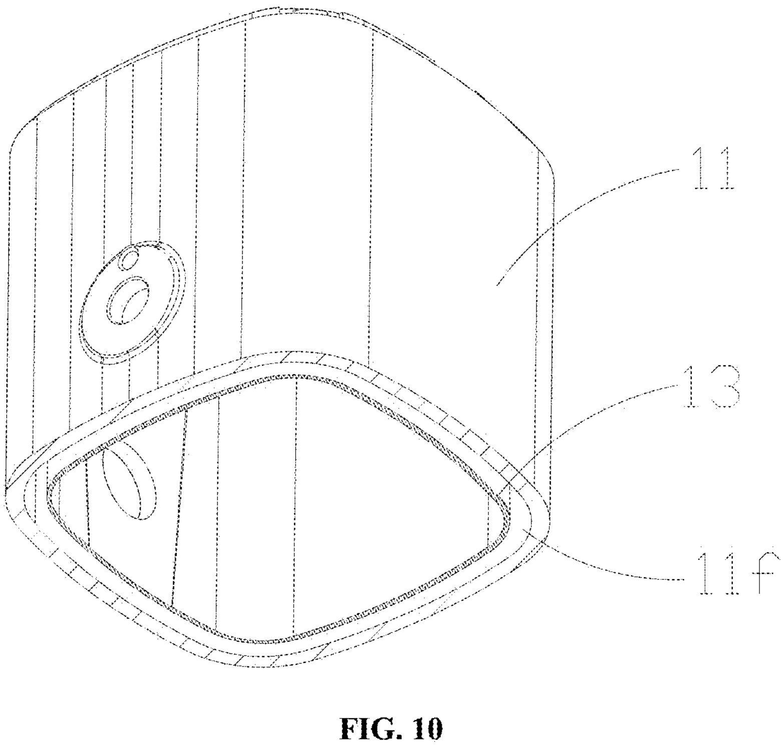
FIG. 10 is a cross-sectional diagram of some structures of the microphone shown in FIG. 1 along line X-X.

Referring to FIG. 10, in this embodiment, there is an interval space 11*f* between the outer shell 11 and the inner shell 13. The interval space 11*f* and the second accommodating chamber 13*a* are both arranged in the first accommodating chamber 11*d*. By the arrangement of the interval space 11*f*, a buffer space can be provided between the two layers of shells, avoiding direct damage to the inner shell 13 after the outer shell 11 is pressed, thereby further protecting the internal components. Meanwhile, the interval space 11*f* can further provide a buffer space for the light emitted by the light-emitting unit 40 after the light passes through the inner shell 13, and then the light is transmitted out through the outer shell 11, so that the light is displayed more uniformly.

Figure 6:
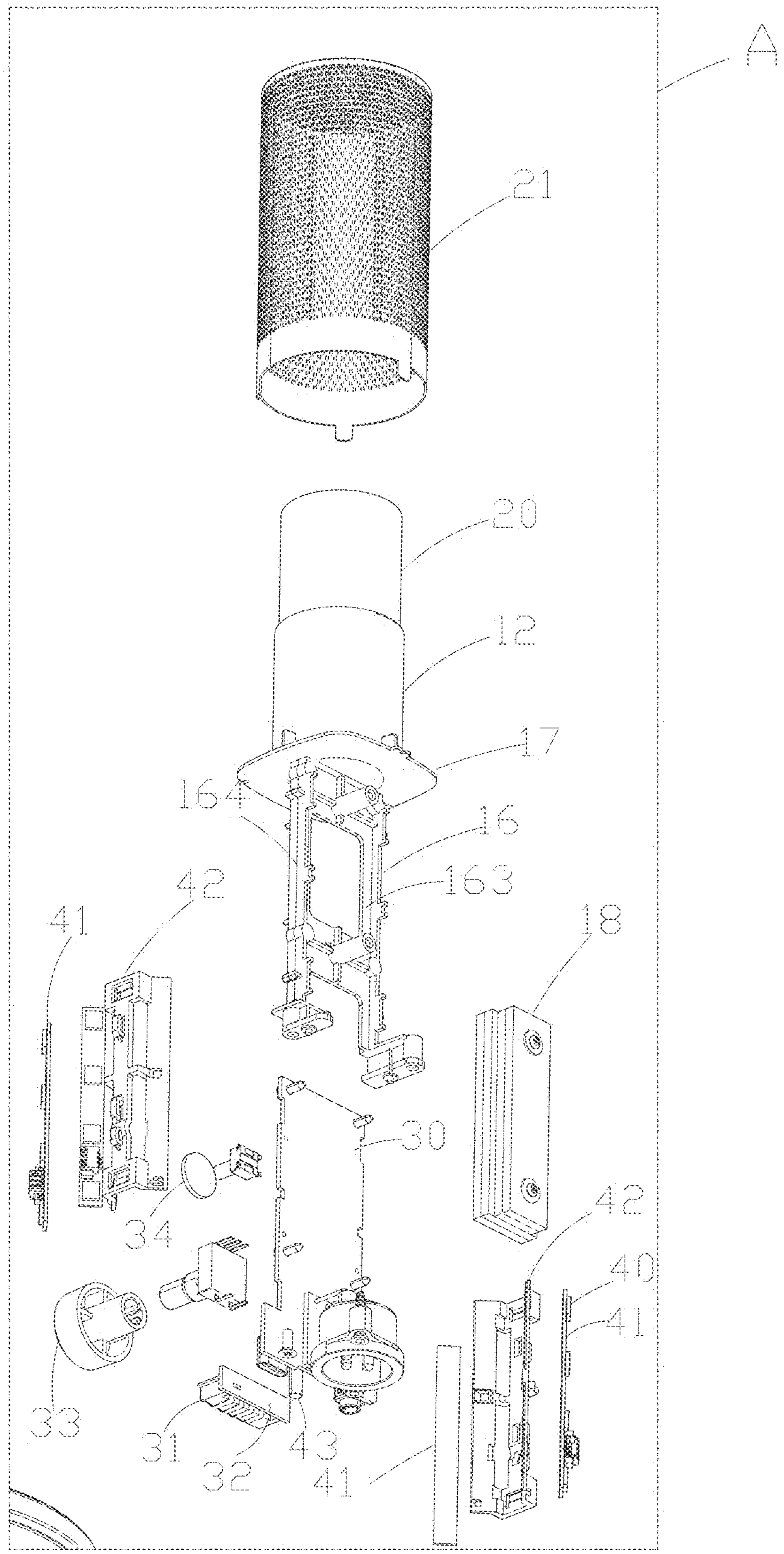
FIG. 6 is an enlarged view of part A of the microphone shown in FIG. 5.
Figure 7:
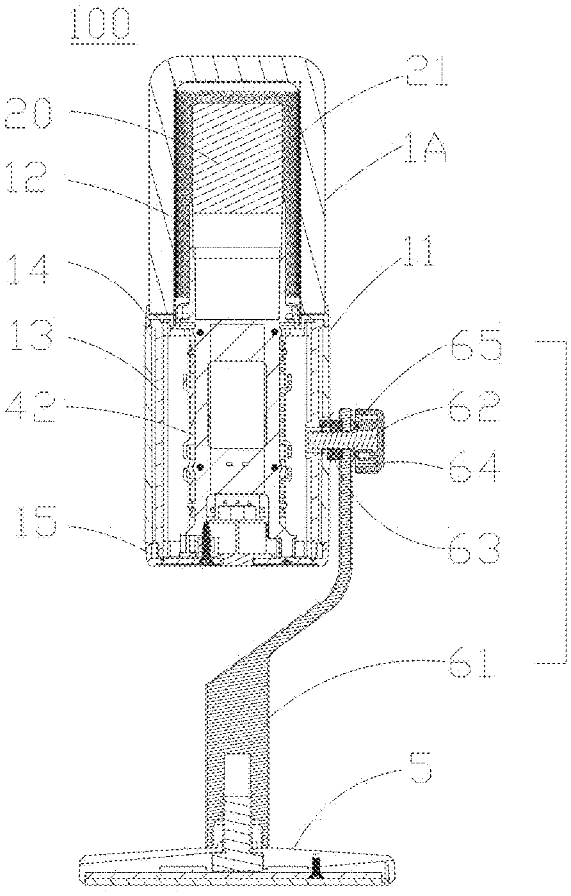
FIG. 7 is a cross-sectional diagram of the microphone shown in FIG. 1 along line VII-VII.

Referring to FIG. 6 and FIG. 7, the shell assembly 1 further includes a mounting frame 16. The mounting frame 16 is arranged in the first accommodating chamber 11*d*. Specifically, the mounting frame 16 is arranged in the second accommodating chamber 13*a*. One end resists against the bottom plate 15 and the other end is connected to the mounting seat 12. The first circuit board 30 is arranged in the mounting frame 16. Specifically, in this embodiment, the first circuit board 30 is connected to the mounting frame 16 by screw fixation. In other embodiments, other connection ways can be further used to achieve the connection between the first circuit board 30 and the mounting frame 16. The cover plate 14 covering the first opening 11*a*, the bottom plate 15 covering the second opening 11*b*, and the outer shell 11 are enclosed to form the first accommodating chamber 11*d*, which can protect the component structures located inside the first accommodating chamber 11*d* and prolong the service life of the product. Meanwhile, the opaque design of the cover plate 14 and the bottom plate 15 ensures that when the light-emitting unit 40 in the microphone 100 emits light, the light can only be transmitted through the outer shell 11. Both the cover plate 14 and the bottom plate 15 are opaque, so that the lighting effect of the product is reflected on the outer shell 11, thereby avoiding the light from irradiating a user or an audience and avoiding interference with the use of the microphone 100. The use experience of the product is better.

Referring to FIG. 4, FIG. 5, and FIG. 6, in this embodiment, the shell assembly 1 further includes a partition plate 17. The partition plate 17 connects the mounting seat 12 with the mounting frame 16, and the mounting seat 12 and the mounting frame 16 are arranged on two opposite sides of the partition plate 17. The partition plate 17 is provided with a hole for a wire to pass through. The wire is configured to electrically connect the microphone head 20 to the first circuit board 30. By the arrangement of the partition plate 17, the positions of the mounting seat 12 and the mounting frame 16 are more obvious and easier to distinguish, so that efficient assembling can be achieved during assembling, and the production efficiency can be improved, thereby reducing the production cost of the product.

The shell assembly 1 further includes a balancing weight 18; the balancing weight 18 is arranged at the mounting frame 16; and the balancing weight 18 and the first circuit board 30 are arranged on the two opposite sides of the mounting frame 16. Specifically, in this embodiment, the balancing weight 18 is fixedly connected to the mounting frame 16 through a screw. In other embodiments, the balancing weight 18 can be connected to the mounting frame 16 through an adhesive, a snap fastener, and the like. The present disclosure does not limit this. The first circuit board 30 is provided with an element and is connected to other parts, so the first circuit board 30 has a weight. When the first circuit board 30 is arranged on a side surface of one side of the mounting frame 16, the center of gravity of the shell assembly is biased towards one side where the first circuit board 30 is located. Therefore, the balancing weight 18 is designed to balance the weight of the first circuit board 30 and other components, thereby ensuring that the center of gravity of the shell assembly 1 is at a preset position and ensuring the self balancing of the product. During use, it is easier for adjustment, thereby enhancing the user experience.

Continuing to refer to FIG. 4, FIG. 5, and FIG. 6, in this embodiment, the shell assembly 1 further includes two decorative sheets 19. The two decorative sheets 19 are respectively arranged on one sides of both the cover plate 14 and the bottom plate 15 away from the outer shell 11. By the arrangement of the decorative sheets 19, exposed portions of the cover plate 14 and the bottom plate 15 can be covered, such as an exposed screw hole or a water mark caused by injection molding, so that the appearance of the product is neater and more beautiful.

In this embodiment, the bottom plate 15 includes a main body portion 151 and a connecting portion 152. The connecting portion 152 is arranged along a circumferential edge of the main body portion 151 and is arranged on one side of the main body portion 151 facing the cover plate 14. The connecting portion 152 is connected to the outer shell 11. An outer surface of the connecting portion 152 and an outer surface of the outer shell 11 resist to form a continuous curved surface or plane, so that surfaces of the shells of the microphone 100 are overall integrated.

Referring to FIG. 5 and FIG. 6, the control assembly 3 further includes an indicator lamp 31. The indicator lamp 31 is arranged in the shell assembly 1 in a penetrating manner. Specifically, the indicator lamp 31 is threaded through the outer shell 11 and is electrically connected to the first circuit board 30. The control assembly 3 further includes a second circuit board 32. The second circuit board 32 is arranged in the first accommodating chamber and is electrically connected to and controls the indicator lamp 31. The second circuit board 32 is electrically connected to the first circuit board 30. By the arrangement of the indicator lamp 31 can provide an indication function when the control assembly 3 controls the microphone 100, making it easier for a user to observe the adjustment effect more intuitively when adjusting and controlling the microphone 100, and enhancing the user experience. By the arrangement of the second circuit board 32 to control the indicator lamp 31, the indicator lamp 31 can better achieve various indication effects.

Specifically, the connecting portion 152 is provided with a via hole that penetrates through the connecting portion 152, and the indicator lamp 31 is arranged in the via hole. It can be understood that the indicator lamp 31 is arranged in the via hole in a penetrating manner, and a light-emitting side of the indicator lamp 31 faces the outside of the microphone 100 for being observed. There are two or more indicator lamps 31. The number of the via holes is consistent with the indicator lamps 31.

The indicator lamp 31 provided in the embodiments of the present disclosure has flexible and diverse indication modes, which can provide feedback through combinations of different colors or different lighting intensities. The present disclosure does not impose a specific limitation on the indication mode of the indicator lamp 31. In this embodiment, two or more indicator lamps 31 are arranged in a linear direction, and the control assembly 3 controls the microphone. For example, during microphone gain adjustment, the corresponding number of indicator lamps 31 work to emit light, the remaining indicator lamps 31 go out. A user can obtain a control procedure prompt of the control assembly 3 for a microphone gain through the number of the indicator lamps 31 that emit light.

Due to the fact that both the indicator lamp 31 and the light-emitting unit 40 are arranged at the first accommodating chamber 11*d*, to avoid interference caused by overlapping between the light emitted by the indicator lamp 31 and the light emitted by the light-emitting unit 40, in this embodiment, the shell assembly 1 further includes a light shielding structure. The light shielding structure is annularly arranged on the indicator lamp 31 to output the light emitted by the indicator lamp 31 to an outer side of the shell assembly 1. The light shielding structure can limit the light of the indicator lamp 31 within a range, so that the light can only be transmitted towards the outer side of the shell assembly 1, thereby avoiding the mutual interference and impact between the inside of the shell assembly 1 and the light emitted by the light-emitting assembly 4.

Specifically, the light shielding structure includes a baffle plate 153 and a partition plate 154. The partition plate 154 is arranged on the main body portion 151. There are at least two partition plates 154 which are arranged oppositely. The baffle plate 153 is connected to the partition plates 154 and resists against the connecting portion 152. The baffle plate 153, the partition plates 154, and the main body portion 151 are enclosed to form a mounting chamber. The indicator lamp 31 is arranged in the mounting chamber. In detail, in this embodiment, the second circuit board 32 is arranged opposite to the connecting portion 152. The two partition plates 154 are arranged opposite to each other, and the baffle plate 153 is arranged opposite to the main body portion 151, thereby forming a sealed mounting chamber. The indicator lamp 31 is arranged in the mounting chamber, so that the light emitted by the indicator lamp 31 can be limited in a predetermined direction, thereby controlling an exit direction of the light emitted by the indicator lamp 31 and avoiding the interference between the inside of the shell assembly 1 and the light emitted by the light-emitting assembly 4.

Due to the fact that there are five indicator lamps 31 in the embodiments of the present disclosure, to avoid mutual interference of the light emitted by the various indicator lamps 31, there are six partition plates 154, thereby forming five mounting chambers with the baffle plate 153, the connecting portion 152, and the main body portion 151 respectively to respectively mount the indicator lamps 31, to avoid mutual the interference of the light emitted by the five indicator lamps 31. Thus, the indicator lamps 31 emit light according to a preset program to achieve an indicator lamp effect.

In other embodiments, the via hole may not be provided on the connecting portion 152, and only a light transmittance region needs to be arranged at positions of the connecting portion 152 corresponding to the indicator lamps 31. Or, the connecting portion 152 is made of a light transmittance material, and then a non light transmittance region is arranged on the connecting portion 152, leaving only the regions corresponding to the indicator lamps 31 for light transmittance, as long as the light emitted by the indicator lamps 31 can be transmitted out of the connecting portion 152.

The control assembly 3 further includes a function knob 33 and a button 34 configured to control the microphone 100 to be muted. The function knob 33 is arranged in the outer shell 11 in a penetrating manner and is electrically connected to the first circuit board 30. The function knob 33 is configured to adjust the gain effect and/or the volume of the microphone 100. The button 34 is electrically connected to the first circuit board 30. The button 34 is arranged in the outer shell 11 in a penetrating manner and is arranged in parallel with the function knob 33. Specifically, holes for allowing the function knob 33 and the button 34 to be threaded are provided on both the outer shell 11 and the inner shell 13, to facilitate operations of a user. In this embodiment, the button 34 can be pressed to mute the microphone 100 during use, and can be pressed again to relieve the mute effect. The operation is convenient. The function knob 33 has at least two functions. In this embodiment, two functions are taken as an example for introduction. During use, the first function is to adjust the gain effect of the microphone 100 by rotation, and the second function is to adjust the volume of earphones by rotation. The two functions can be switched by pressing the function knob 33. In other embodiments, the function knob 33 may alternatively have a third function or more functions. The functions can be switched by pressing. The function knob integrates multiple function adjustments, so that the overall operation buttons of the product are reduced, and the appearance is neater and more beautiful.

Figure 13:
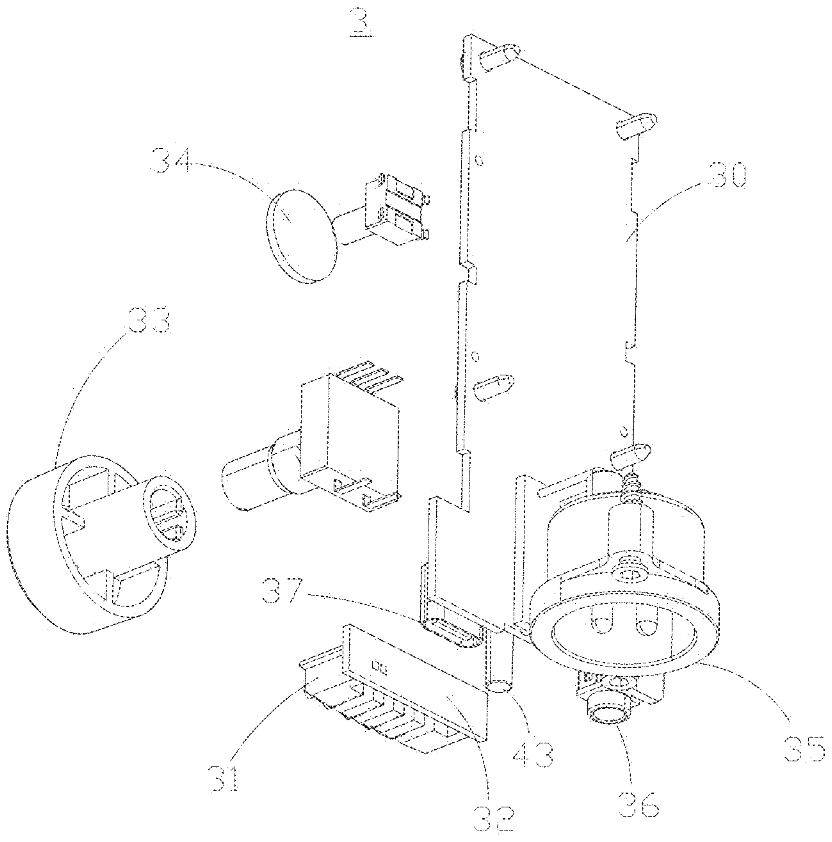
FIG. 13 is a schematic diagram of a control assembly of the microphone shown in FIG. 1.
Figure 14:
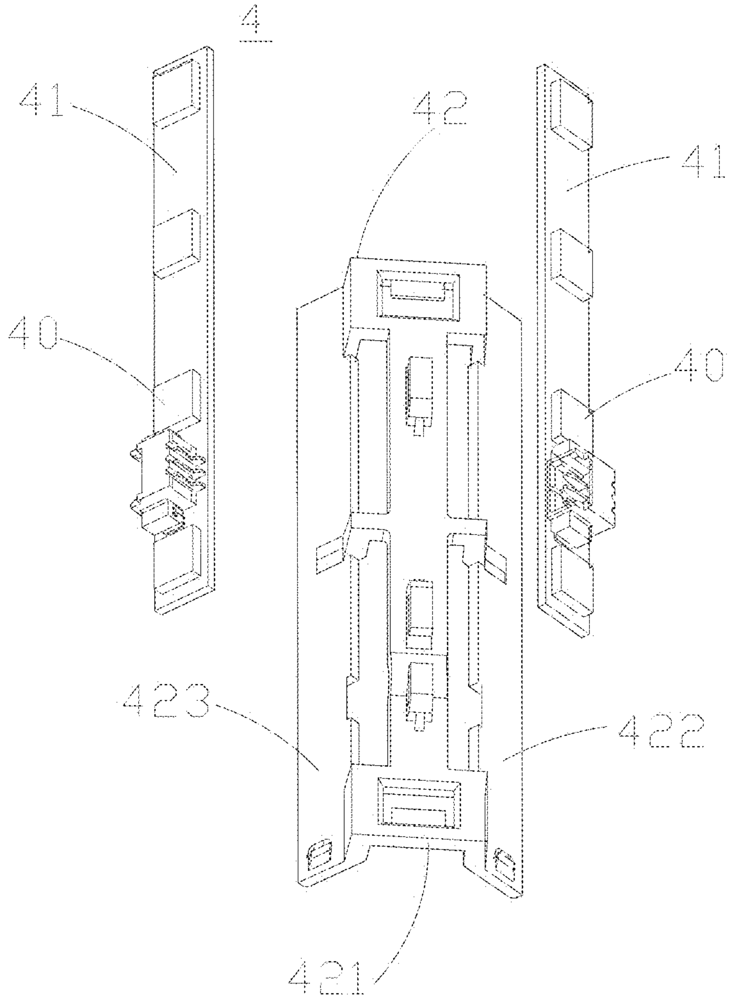
FIG. 14 is a schematic diagram of a light-emitting assembly of the microphone shown in FIG. 1.

Referring to FIG. 13, the control assembly 3 further includes a first audio jack 35 arranged in the shell assembly 1 in a penetrating manner and connected to an external audio device, an earphone jack 36 for being connected to external earphones, and a second audio jack 37 for being connected to an external device to transmit data. The first audio jack 35, the earphone jack 36, and the second audio jack 37 are all electrically connected to the first circuit board 30. Specifically, the first audio jack 35, the earphone jack 36, and the second audio jack 37 are all arranged in the bottom plate 15 in a penetrating manner. The bottom plate 15 is provided with corresponding holes. The first audio jack 35 is configured to be connected to another external device such as a sound card or an audio device, to achieve seamless compatibility. The second audio jack 37 is configured to be connected to another device, such as a computer and a tablet, to achieve data transmission such as audio data transmission. The two audio jacks enhance the functionality of the microphone 100, which is convenient for a user to use multiple interfaces. The main function of the earphone jack 36 is to be connected to the earphones for transmission of audio signals, thus allowing a user to listen to sound through the earphones. Specifically, the second audio jack 37 can be a USB interface or a type-c interface.

Referring to FIG. 4 to FIG. 6 and FIG. 14, in this embodiment, the light-emitting assembly 4 further includes a third circuit board 41 arranged in the first accommodating chamber 11*d*. Specifically, the third circuit board 41 is arranged in the second accommodating chamber 13*a*. The third circuit board 41 is electrically connected to and controls the light-emitting unit 40 to emit light. The third circuit board 41 is electrically connected to the first circuit board 30. There are two or more third circuit boards 41, and there are two or more light-emitting units 40. The light-emitting units 40 are arranged on the third circuit boards 41, and the third circuit boards 41 are annularly arranged on an outer side of the first circuit board 30. The third circuit boards 41 can be flexible circuit boards or rigid circuit boards. The present disclosure does not limit this. The light-emitting units 40 are LEDs. The LEDs can emit light with various colors and can be selected according to a need. The third circuit boards 41 are electrically connected to the light-emitting units 40, which can better control the light emission of the light-emitting units 40 to achieve various lighting effects, so that the user experience is better. By the arrangement of the plurality of third circuit boards 41 and light-emitting units 40, the light can be displayed more uniformly on the outer shell 11, thereby enhancing the lighting effect of the microphone 100, enhancing the user experience, and improving the competitiveness of the product.

Further, the light-emitting assembly 4 further includes a connector 42; the connector 42 is arranged on one side of the first circuit board 30; and the light-emitting unit 40 is arranged on the connector 42. Specifically, in this embodiment, the third circuit board 41 is arranged on the connector 42. The connector 42 is connected to the mounting frame 16 and resists against the first circuit board 30. A connection relationship between the connector 42 and the mounting frame 16 is buckle connection. One of the connector 42 and the mounting frame 16 is provided with a buckle, and the other one is provided with a buckle slot, to achieve snap fit. In other embodiments, the connection relationship between the connector 42 and the mounting frame 16 may alternatively be fixed connection. Namely, the connection is achieved through a screw or an adhesive. The present disclosure does not impose a specific limitation on this.

Specifically, in the embodiments of the present disclosure, the connector 42 includes a connecting plate 421, a first extension plate 422 arranged on one side of the connecting plate 421, and a second extension plate 423 arranged on the other side of the connecting plate 421. The first extension plate 422 and the second extension plate 423 are respectively connected to two opposite sides of the connecting plate 421 and have an angle with the connecting plate 421. The first extension plate, the second extension plate, and the connecting plate are enclosed to form a semi-enclosed groove-like structure. The connecting plate 421 is in buckle connection with the mounting frame 16. One of the connecting plate and the mounting frame is provided with a buckle, and the other one is provided with a buckle slot, to achieve snap fit. The third circuit board 41 is arranged on the first extension plate 422 or the second extension plate 423. When there are a plurality of third circuit boards 41, the third circuit boards 41 are arranged on both the first extension plate 422 and the second extension plate 423. Specifically, in the embodiments of the present disclosure, the third circuit boards 41 are arranged on both the first extension plate 422 and the second extension plate 423.

In this embodiment, there are two connectors 42 which are arranged on two opposite sides of the first circuit board 30, and the connectors 42 wrap around at least a portion of the first circuit board 30. The two connectors 42 are respectively connected to two opposite sides of the mounting frame 16. The first circuit board 30 and the balancing weight 18 are respectively arranged on two other opposite sides of the mounting frame 16. The two connectors 42, the first circuit board 30, and the balancing weight 18 are annularly arranged at a periphery of the mounting frame 16. The two connectors 42 wrap around at least a portion of the first circuit board 30 and at least a portion of the balancing weight 18, and respectively resist against the first circuit board 30 and the balancing weight 18. Namely, the mounting frame 16, the first circuit board 30, and the balancing weight 18 are partially or entirely arranged between the two connectors 42, and the semi-enclosed groove-like structures of the two connectors 42 accommodate the mounting frame, the first circuit board, and the balancing weight. Specifically, the connecting plate 421 is connected to the mounting frame 16 and resists against the first circuit board 30 and the balancing weight 18. The first circuit board 30 and the balancing weight 18 are sandwiched between the first extension plate 422 and the second extension plate 423.

Specifically, the entire mounting frame 16 is generally a rectangular structure with a thickness, which has four side surfaces distributed in four vertical directions, namely a first side surface 161, a second side surface 162, a third side surface 163, and a fourth side surface 164. The first side surface 161 and the third side surface 163 are two side surfaces with large widths, and the second side surface 162 and the fourth side surface 164 are two side surfaces with small widths. The first side surface 161 and the third side surface 163 are arranged opposite to each other, and the second side surface 162 and the fourth side surface 164 are arranged opposite to each other. The first circuit board 30 and the balancing weight 18 are respectively arranged on the first side surface 161 and the third side surface 163. The two connectors 42 are respectively arranged on the second side surface 162 and the fourth side surface 164. By the arrangement of the connectors 42, the light-emitting units 40 can be better fixed, and detachment of the light-emitting units 40 can be avoided. Meanwhile, the two opposite connectors 42 wrap around the first circuit board 30, which can better protect the first circuit board 30 and make a better use of an internal space of the product, thereby reducing the cost of the product. The light-emitting units 40 are arranged on the two opposite sides of the first circuit board 30. This design can make the distribution of light sources more uniform.

Specifically, the light-emitting assembly 4 further includes an on/off button 43 arranged in the shell assembly 1 in a penetrating manner. The on/off button 43 is electrically connected to the third circuit board 41 to control the light-emitting unit 40. The on/off button 43 is configured to control the light-emitting unit 40 to be turned on and turned off, and to adjust the color and flashing mode of the light source, so that the product has high functionality.

Figure 15:
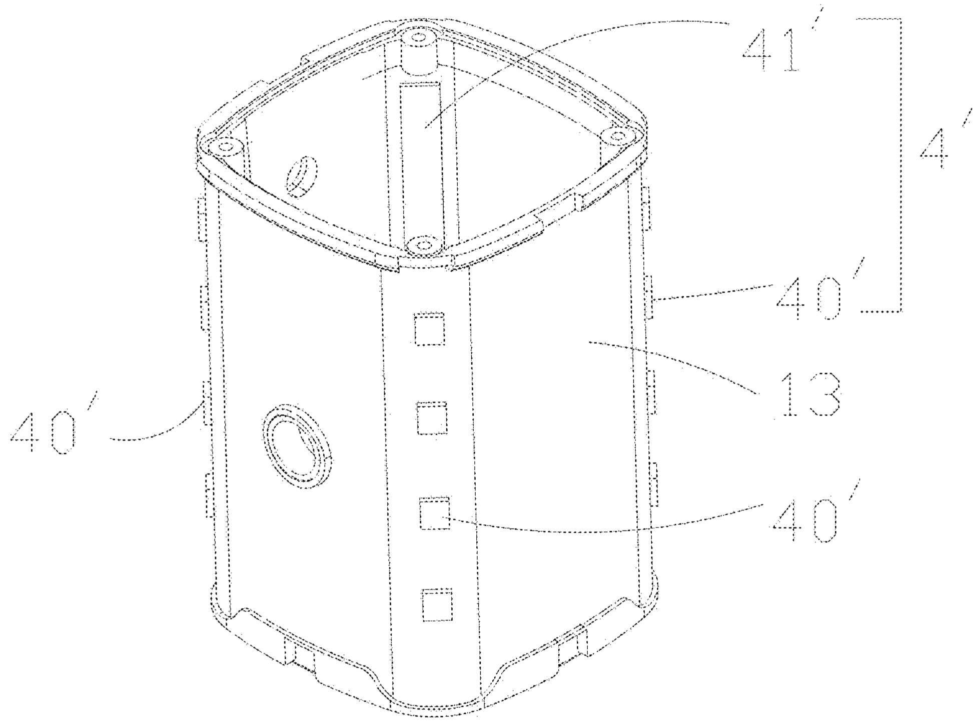
FIG. 15 is another schematic structural diagram of a light-emitting assembly of a microphone according to a first embodiment of this application.

Referring to FIG. 15, FIG. 15 is another schematic structural diagram of a light-emitting assembly of a microphone according to an embodiment of this application. In this embodiment, only a portion of the structure and positional relationship when the light-emitting assembly 4' is compared with the light-emitting assembly 4 in the previous embodiment. In this embodiment, the light-emitting assembly 4' includes a light-emitting unit 40' and a third circuit board 41'. The light-emitting unit 40' is arranged on the third circuit board 41', and the third circuit board 41' is arranged at the inner shell 13. Specifically, the third circuit board 41' is arranged on an inner wall of the inner shell 13. The inner shell 13 is provided with a penetrating hole. The light-emitting unit 40' is arranged in the hole in a penetrating manner. A light-emitting surface of the light-emitting unit 40' faces the outer shell 11. When the light-emitting unit 40' is turned on, emitted light can be transmitted through the outer shell 11. In this embodiment, the third circuit board 41' is arranged in an axial direction of the inner shell 13. In other embodiments, the third circuit board 41' may alternatively be arranged in a circumferential direction of the inner shell 13.

Figure 16:
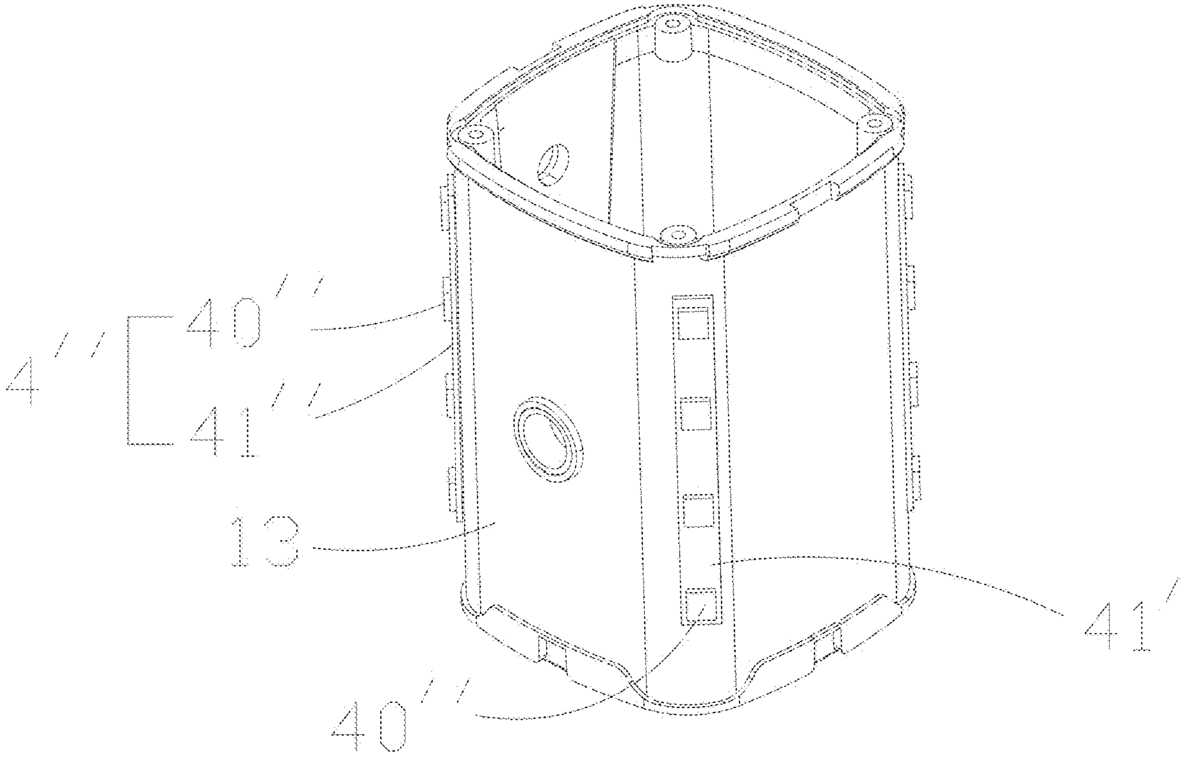
FIG. 16 is still another schematic structural diagram of a light-emitting assembly of a microphone according to a first embodiment of this application.

Referring to FIG. 16, FIG. 16 provides still another schematic structural diagram of a light-emitting assembly of a microphone. In this embodiment, when the light-emitting assembly 4" is compared with the light-emitting assembly 4 in the previous embodiment, only the positional relationship changes. Specifically, the light-emitting assembly 4" includes a light-emitting unit 40" and a third circuit board 41". The light-emitting unit 40" is arranged on the third circuit board 41", and the third circuit board 41" and the light-emitting unit 40" are arranged in the interval space **11*f*. Specifically, the third circuit board 41' is arranged on an outer side wall of the inner shell 13. A light-emitting surface of the light-emitting unit 40" faces the outer shell 11. When the light-emitting unit 40" is turned on, emitted light can be transmitted through the outer shell 11. In this embodiment, the third circuit board 41" is arranged in an axial direction of the inner shell 13. In other embodiments, the third circuit board 41" may alternatively be arranged in a circumferential direction of the inner shell 13**.

Continuing to refer to FIG. 1 to FIG. 7, the microphone 100 further includes a base 5 and a supporting assembly 6. The supporting assembly 6 is connected to the base 5, and the supporting assembly 6 is configured to be rotatably connected to the shell assembly 1. The supporting assembly 6 includes a support 61 and a rotating shaft 62. One end of the support 61 is connected to the base 5, and the rotating shaft 62 is arranged at one end of the support 61 away from the base 5. The rotating shaft 62 is arranged in the outer shell 11 in a penetrating manner, and the outer shell 11 is configured to rotate around the rotating shaft 62. Furthermore, one end of the support 61 away from the base 5 is rotatably connected to a side surface of the shell assembly 1. Specifically, one end of the support 61 away from the base 5 is rotatably connected to one end of the sidewall structure of the outer shell 11 away from the bottom plate 15.

In this embodiment, the support 61 is a unilateral support, and shell assembly 1 is supported and rotated only through the unilateral support. Specifically, the support 61 is only connected to one side surface of the outer shell 11. In this way, most of the area of the outer shell 11 can be redesigned for layout, so that the appearance of the product is neater and more beautiful. When the light-emitting unit 40 emits light, the outer shell 11 can show a larger area of light and a cooler lighting effect.

Referring to FIG. 7, in this embodiment, the support 61 is connected to the base 5 by screwing. Specifically, an internal threaded hole is provided at one end of the support 61 connected to the base 5, and a bolt is in threaded connection with the internal threaded hole of the support 61 through the base 5. In this embodiment, the base 5 can be removed from the support 61 through the bolt, so that the microphone 100 can be connected to an external cantilever support through the internal threaded hole on the support 61, thereby expanding the usage scenario of the microphone 100. The microphone 100 can not only be used on a surface of an object, such as a desktop, but also suspended and used through the external cantilever support. By the arrangement of the base 5, the microphone 100 can be placed steadily on the surface of the object. The shell assembly 1 can rotate relative to the rotating shaft 62. As the shell assembly 1 can rotate, it is convenient for a user to adjust an inclination angle of the microphone 100, and it is more convenient for use and for the microphone head 20 to pick up sounds. The user experience is enhanced.

Figure 17:
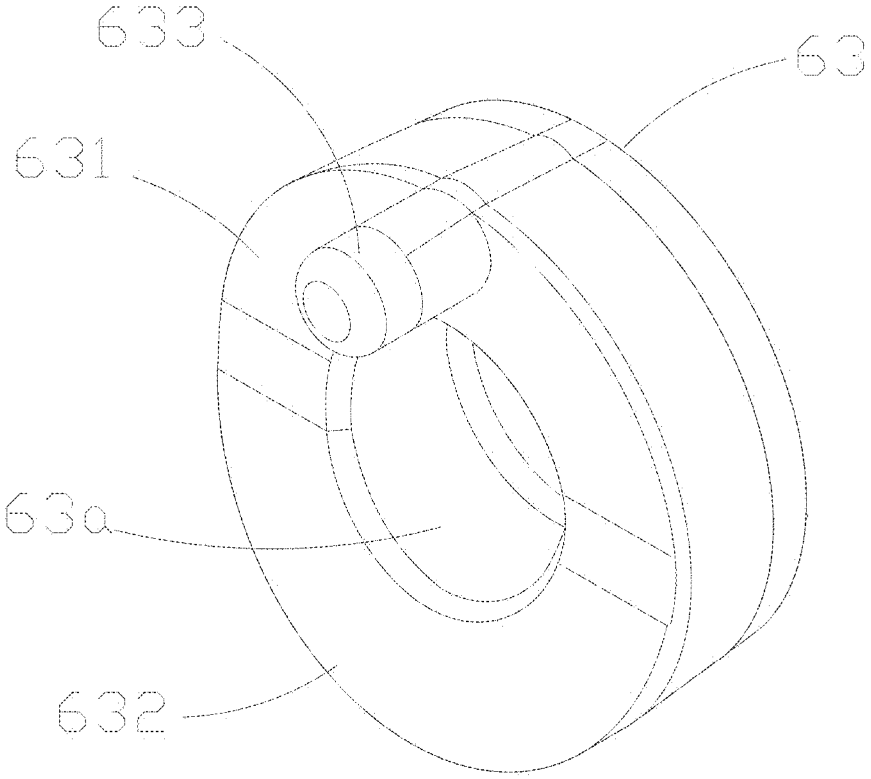
FIG. 17 is a three-dimensional diagram of a first gasket of the microphone shown in FIG. 1.

Referring to FIG. 4 and FIG. 5, the supporting assembly 6 further includes a first gasket 63 with a through hole 63*a*. The first gasket 63 is arranged between the outer shell 11 and the support 61. The rotating shaft 62 is arranged in the through hole 63*a* in a penetrating manner. Referring to FIG. 17 for details, the first gasket 63 includes a first portion 631 and a second portion 632. The first portion 631 and the second portion 632 are located on two opposite sides of an axis of the through hole 63*a*, and a thickness of the second portion 632 is greater than a thickness of the first portion 631. The second portion 632 is located at one end of the first gasket 63 close to the base 5. In this embodiment, the first gasket 63 is made of a soft material such as silica gel and rubber. The first gasket 63 can enlarge a contact area between the outer shell 11 and the support 61, so that the shell assembly 1 can be maintained in a desired angle after rotating relative to the support 61 to adjust the inclination angle. The first gasket 63 is set to have a thin top and a thick bottom, so that the shell assembly 1 can play a role of supporting and compensation under the action of its gravity and a supporting force of the rotating shaft 62. The second portion is thick, which can better support the shell assembly 1.

Referring to FIG. 8, the outer shell 11 is provided with a first mounting hole 11*c* and a first protrusion 111 configured to enhance the strength of the outer shell 11. The first protrusion 111 is annularly arranged at the first mounting hole 11*c*. The rotating shaft 62 is arranged in the first mounting hole 11*c* in a penetrating manner, and at least a portion of the first gasket 63 is arranged in the first mounting hole 11*c* in a penetrating manner.

Referring to FIG. 9, in this embodiment, a second mounting hole 13*b* for threading the rotating shaft 62 is also correspondingly provided at a position, corresponding to the first mounting hole 11*c* of the outer shell 11, on the inner shell 13. An inner diameter of the second mounting hole 13*b* is approximately equal to an inner diameter of the first mounting hole 11*c*. A second protrusion 131 is arranged at a periphery of the second mounting hole 13*b* to enhance the strength of the inner shell 13. The outer shell 11 has light transmittance, achieving light transmittance. Meanwhile, if the first mounting hole 11*c* is provided on the outer shell 11, the strength of the outer shell 11 will be inevitably affected. As the first protrusion 111 is arranged at the periphery of the first mounting hole 11*c*, it plays a reinforcing bar role, so that the strength of the outer shell 11 can be enhanced, avoiding damage to the outer shell 11 and ensuring that the product has good quality. Furthermore, the first protrusion 111 protrudes out of the outer shell 11, so that a gap is reserved between the support 61 and the outer shell 11. This allows the microphone 100 to have an avoidance space when it is rotated or deflects due to an external force, thereby avoiding friction and collision between the outer shell 11 and the support 61, avoiding the damage to the outer shell 11, and ensuring the beautiful appearance of the microphone 100.

Specifically, a third protrusion 132 is further arranged on the inner shell 13. The third protrusion 132 is annularly arranged at a periphery of the second protrusion 131 and is connected to the inner shell 13. A height of the third protrusion 132 is greater than that of the second protrusion 131. In this embodiment, the third protrusion 132 is integrally connected to the second protrusion 131. By the additional arrangement of the third protrusion 132, the shell strength close to the second mounting hole 13*b* of the inner shell 13 is further enhanced, ensuring that the shell strength of the inner shell 13 can be enough to bear and support the microphone 100. During rotation relative to the rotating shaft 62, it can still ensure that the shell strength will not be lowered, thereby prolonging the service life of the product.

Figure 11:
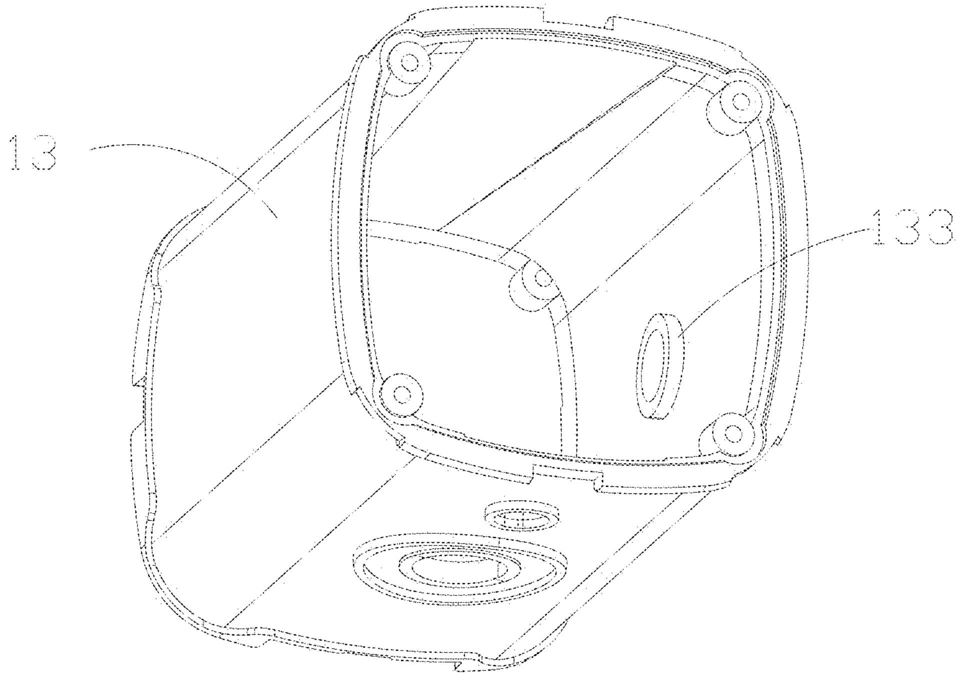
FIG. 11 is a three-dimensional diagram of then inner shell of the microphone in another shown in FIG. 1.
Figure 12:
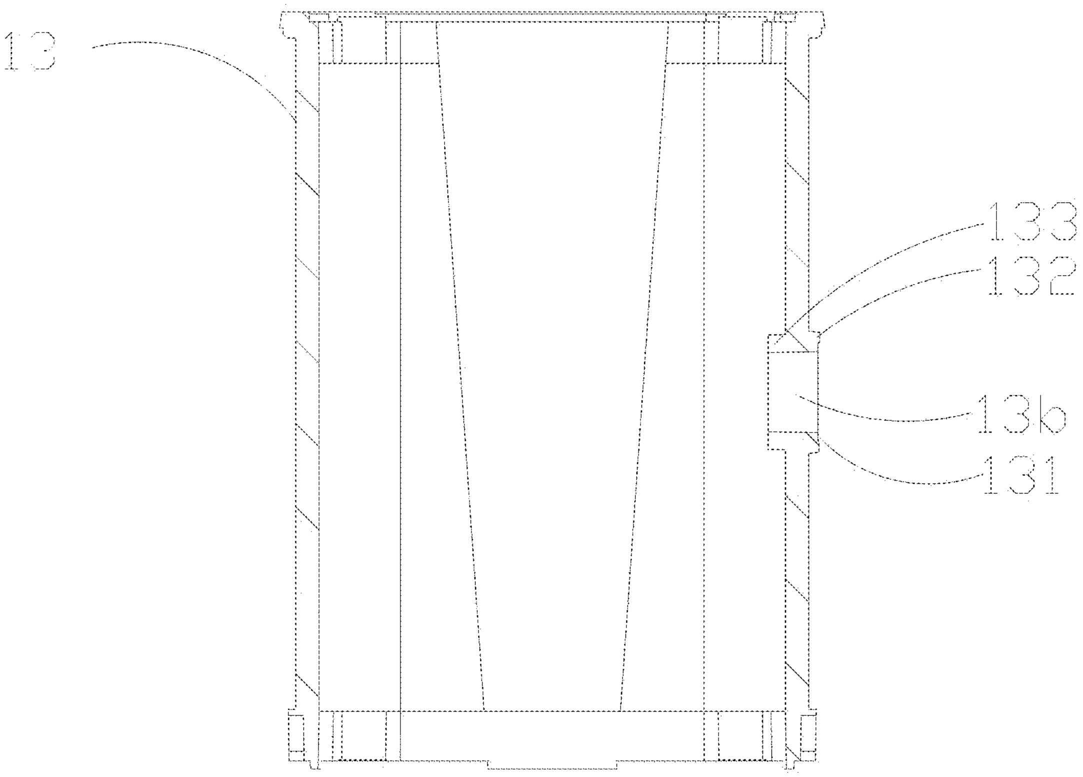
FIG. 12 is a cross-sectional diagram of an inner shell of the microphone shown in FIG. 7 along line VII-VII.

Referring to FIG. 11 and FIG. 12, the inner shell 13 is further provided with a fourth protrusion 133. The fourth protrusion 133 is annularly arranged at the second mounting hole 13*b*. The fourth protrusion 133 is arranged on one side of the inner shell 13 away from the outer shell 11. In this embodiment, the fourth protrusion 133 and the second protrusion 131, as well as the third protrusion 132, are respectively arranged on two sides of the inner shell 13, and are annularly arranged at the second mounting hole 13*b*. By the arrangement of the fourth protrusion 133, the shell strength of the inner shell 13 close to the second mounting hole 13*b* is further enhanced, thereby reducing the impact of the second mounting hole 13*b* on the shell strength of the inner shell 13.

Specifically, continuing to refer to FIG. 17, the first gasket 63 is provided with a positioning column 633. The positioning column 633 is located on the first portion 631 and faces one side of the outer shell 11. A positioning hole 11*e* is provided at a corresponding position on the outer shell 11. The positioning column 633 is arranged in the positioning hole 11*e* in a penetrating manner. In this embodiment, the positioning column 633 is made of a soft material and resists against the inner shell 13, specifically, the second protrusion 131. In other embodiments, the positioning column 633 is arranged in the positioning hole 11*e* in the penetrating manner and may not resist against the inner shell 13 or the second protrusion 131. By the arrangement of the positioning column 633 on the first gasket 63 and cooperation with the positioning hole 11*e* on the outer shell 11, it can ensure that the relative positions of the first gasket 63 and the outer shell 11 are fixed, so that when the outer shell 11 rotates relative to the rotating shaft 62, the first gasket 63 rotates with the outer shell 11, thereby increasing the friction force during the rotation, ensuring that the shell assembly 1 can be maintained in an angle desired by a user without rotation, and improving the stability of the microphone 100. Referring to FIG. 4 and FIG. 5, the supporting assembly 6 further includes a fastener 64. The fastener 64 is connected to one end of the rotating shaft 62 away from the outer shell 11 and is located on one side of the support 61 away from the outer shell 11. In this embodiment, the rotating shaft 62 is connected to the fastener 64 in a non-rotatable manner. The end of the rotating shaft 62 connected to the fastener 64 is designed as a polygon along an axial view. A matching slot is provided in the fastener 64, so that the non-rotatable connection between the rotating shaft 62 and the fastener 64 is achieved. In other embodiments, the rotating shaft 62 can be fixedly connected to or integrally formed with the corresponding fastener 64. The supporting assembly 6 further includes a second gasket 65. The second gasket 65 is arranged between the support 61 and the fastener 64. By the arrangement of the fastener 64, the rotating shaft 62 passes through the support 61 to ensure the length of the rotating shaft 62 and to further play a balancing role. The support 61 acts as a fulcrum, so that the shell assembly 1 and the fastener 64 are located at two ends of the rotating shaft 62, thereby balancing the weight of the shell assembly 1. In addition, the fastener 64 can further ensure that the rotating shaft 62 will not fall off from the support 61. The second gasket 65 can enlarge a contact area between the support 61 and the fastener 64, thereby achieving antislip and stabilizing effects.

The sound pickup assembly 2 further includes a mesh enclosure 21, and the mesh enclosure 21 covers the microphone head 20. In this embodiment, the mesh enclosure 21 further covers the mounting seat 12 and resists against the cover plate 14. The shell assembly 1 further includes a sponge cover 1A. The sponge cover 1A is covered at the mesh enclosure 21 and resists against the outer shell 11. On the one hand, the sponge cover 1A can effectively prevent popping noise, protect the microphone head 20 of the microphone 100, and prevent saliva splashing On the other hand, an air flow of plosive directly blown to the microphone head 20 can be reduced, thereby prolonging the service life of the microphone 100 and enhancing the user experience.

Figure 18:
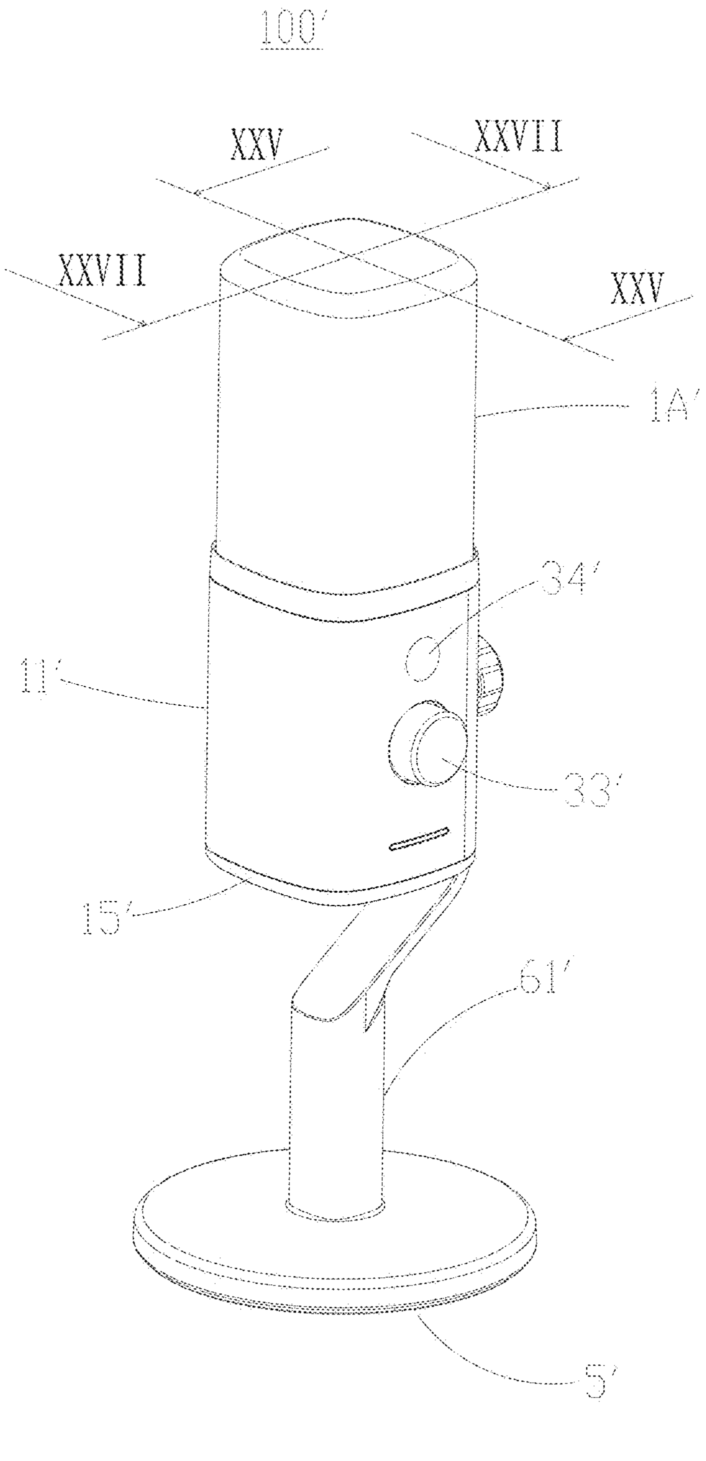
FIG. 18 is a three-dimensional diagram of a microphone according to a second embodiment of this application.
Figure 19:
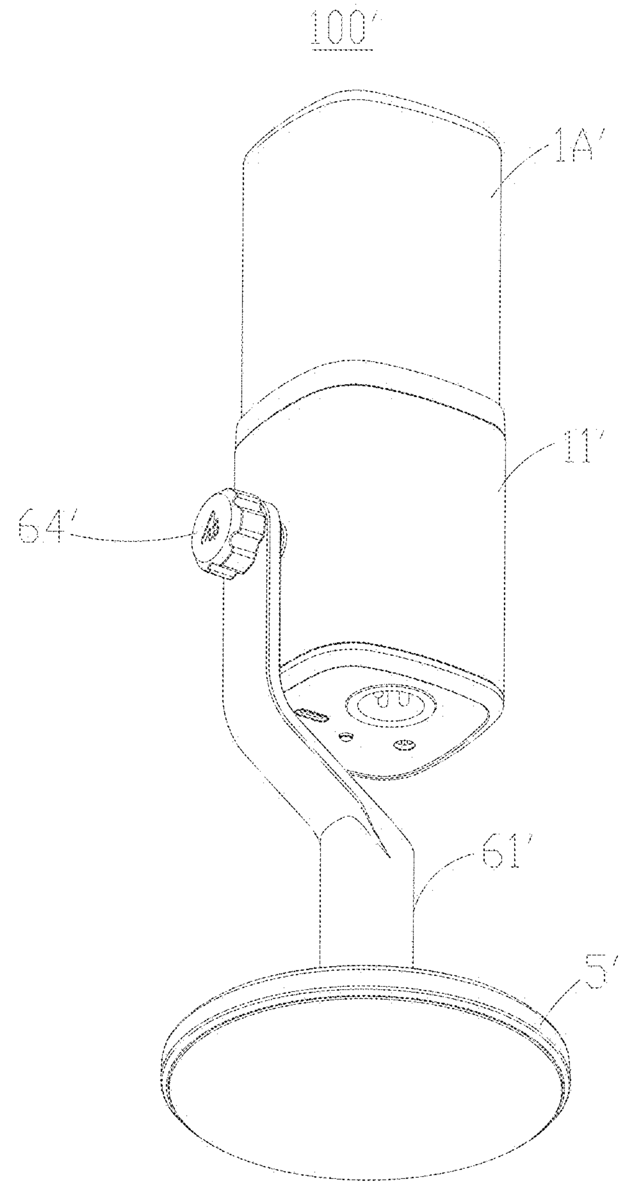
FIG. 19 is a three-dimensional diagram of the microphone in another angle according to the second embodiment of this application.
Figure 20:
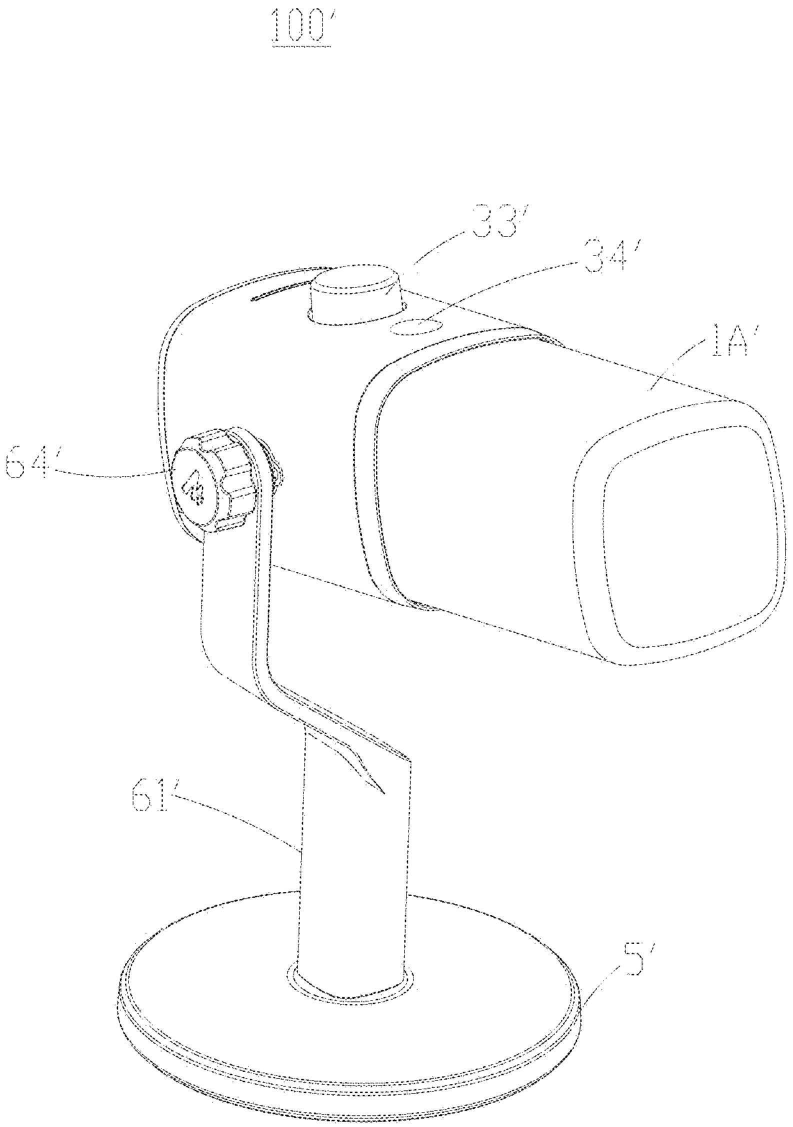
FIG. 20 is a three-dimensional diagram of the microphone in a usage state according to the second embodiment of this application.

Please refer to FIG. 18, FIG. 19 and FIG. 20. FIG. 18 and FIG. 19 are three-dimensional diagrams of the microphone 100' according to the second embodiment of the present disclosure in two different angles. When not in use, the microphone 100' can be rotated to a state shown in FIG. 18 or FIG. 19 for convenient storage and carrying. FIG. 20 is a three-dimensional diagram of the microphone 100' in a usage state according to an embodiment of the present disclosure. When using the microphone 100', a user will rotate and adjust the microphone 100' to a proper angle for better sound pickup. such as a usage state shown in FIG. 20, which is only a schematic diagram of a rotation angle. The microphone 100' disclosed in the present disclosure can be rotated according to a need of the user and maintained in different angles. The present disclosure will not show and elaborate them one by one again.

Figure 21:
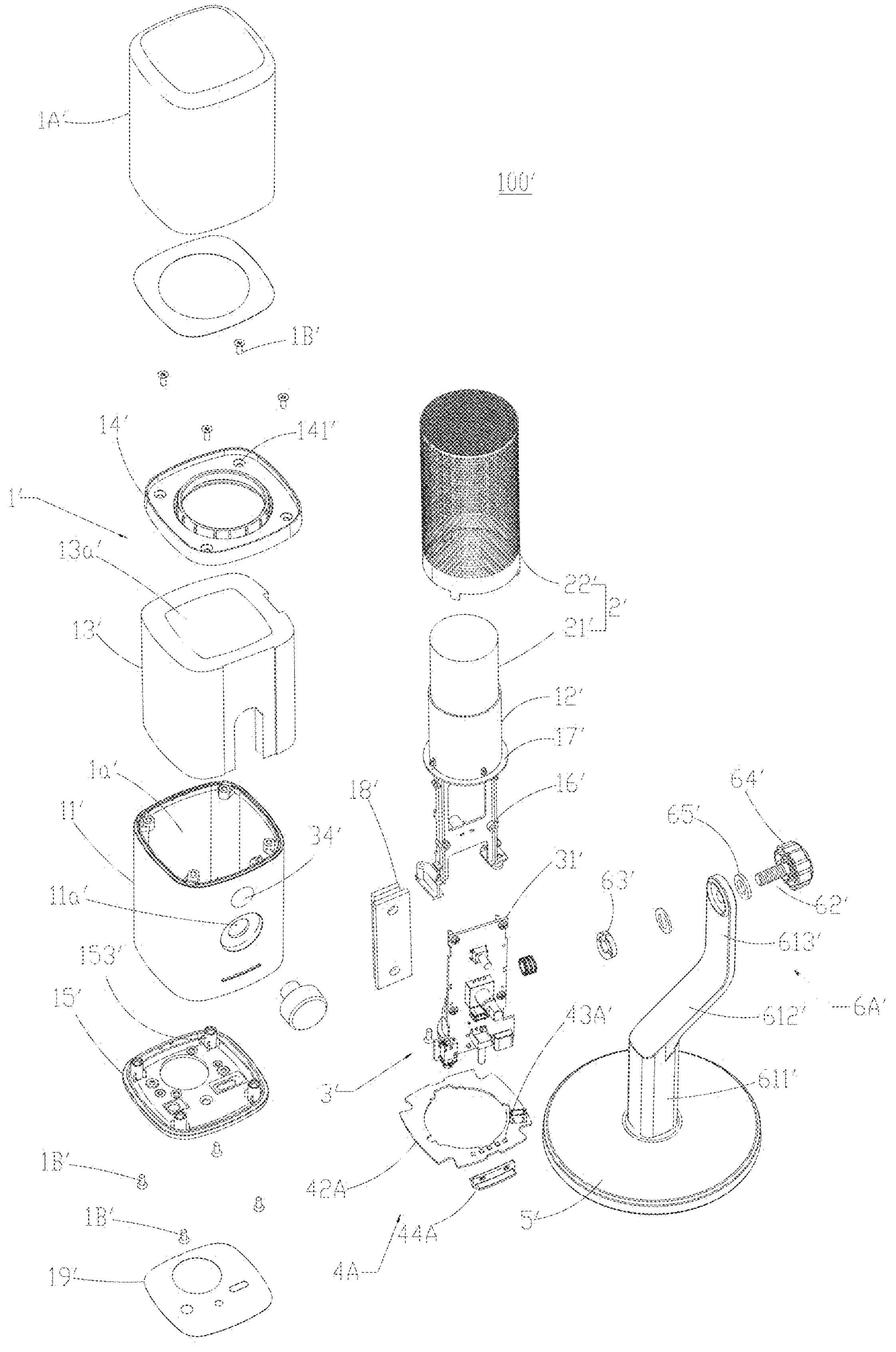
FIG. 21 is an exploded diagram of the microphone according to the second embodiment of this application.
Figure 22:
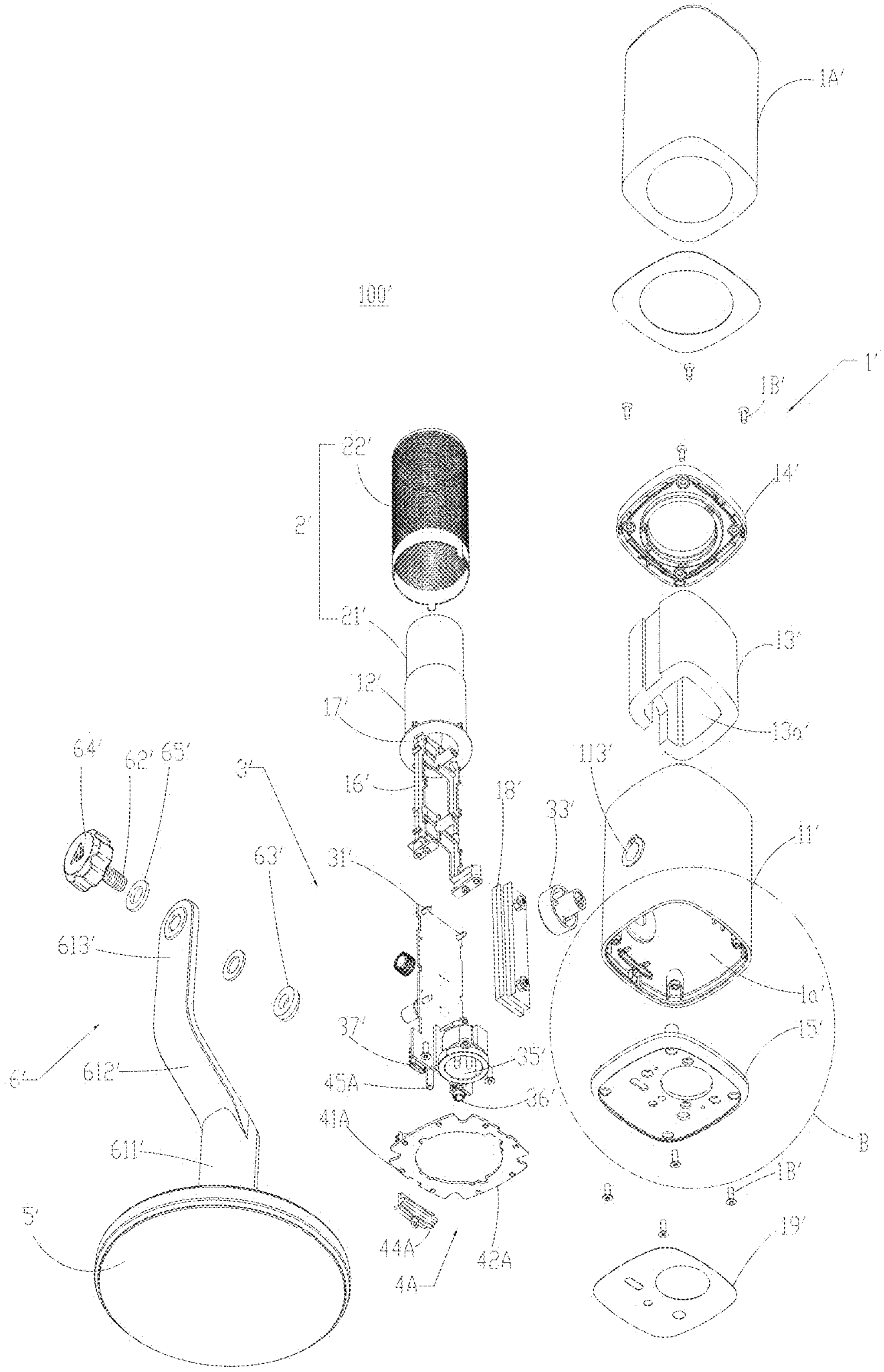
FIG. 22 is an exploded diagram of the microphone in another angle according to the second embodiment of this application.

Referring to FIG. 21 and FIG. 22, the microphone 100' according to an embodiment of the present disclosure includes a shell assembly 1', a sound pickup assembly 2', a control assembly 3', a light-emitting assembly 4A and a connecting frame 6'. The shell assembly 1' includes an outer shell 11', a cover plate 14' and a bottom plate 15'. The cover plate 14' and the bottom plate 15' are arranged to cover the opposite ends of the outer shell 11'. The outer shell 11', the cover plate 14' and the bottom plate 15' enclose to form a first accommodating chamber 1*a'*. The sound pickup assembly 2' includes a microphone head 21' for sound pickup, and the microphone head 21' is arranged at one end of the shell assembly 1' adjacent to the cover plate 14'. The control assembly 3' includes a first circuit board 31', the first circuit board 31' is arranged in the first accommodating chamber 1*a'*, and is electrically connected to the microphone head 21'. The light-emitting assembly 4A includes a light-emitting unit 41A, the light-emitting unit 41A is arranged in the first accommodating chamber 1*a'* and is electrically connected to the first circuit board 31', and the light-emitting unit 41A is configured to allow emitted light to pass through the bottom plate 15'. The connecting frame 6' is configured to be rotatably connected to the shell assembly 1', and is further configured to support the microphone 100' on an external object. Further, the outer shell 11' and the bottom plate 15' correspond to the shell body 10 in the above embodiment.

Compared with the prior art, the microphone 100' provided in the present disclosure employs the light-emitting unit 41A to transmit the emitted light through the bottom plate 15' to the outside of the shell assembly 1', thereby enabling the microphone 100' to produce colorful lighting effects during use. This configuration not only enhances the functionality of the microphone 100' but also allows users to enjoy both auditory and visual effects simultaneously, which significantly improves the product's entertainment value. Additionally, the provision of the connecting bracket 6' facilitates the rotation of the shell assembly 1', enabling users to adjust the angle and enabling multi-scenario use.

In this embodiment, when the microphone 100' is placed vertically on an object surface (e.g., a desktop) as shown in FIG. 18, the cover plate 14', the outer shell 11', and the bottom plate 15' are sequentially arranged from top to bottom, with the bottom plate 15' positioned at the bottom of the microphone 100'. By this configuration, when the light emitted from the light-emitting unit 41A passes through the bottom plate 15' to generate lighting effects, such lighting effects do not interfere with the user's operation during use of the microphone 100', while still allowing both the user and audience to clearly observe the lighting effect, thereby providing dazzling visual displays for all observers.

Specifically, in this embodiment, the light-emitting unit 41A includes a plurality of LED lamp beads. The LED lamp beads can emit light in multiple colors, thereby producing the lighting effects more dazzling and aesthetically pleasing.

To prevent light emitted by the light-emitting unit 41A from transmitting through other portions of the shell assembly 1' (which could interfere with user operation or cause light pollution), both the outer shell 11' and the cover plate 14' are configured with light-shielding properties. This configuration restricts light transmission exclusively through the bottom plate 15', creating circumferential lighting effect around the bottom of the microphone 100'. To enhance the lighting effect presented by the bottom plate 15', the bottom plate 15' has light transmittance, allowing the light emitted by the light-emitting unit 41A to pass through. The present application provides flexible light-transmittance characteristics for the bottom plate 15', including but not limited to: full light transmission, high-transmissivity, or low-transmissivity configurations. The bottom plate 15' may incorporate different material compositions according to predetermined light-transmission requirements to achieve selective light transmission. This enables the selective transmission of user-preferred light spectra, thereby enhancing visual performance.

Figure 23:
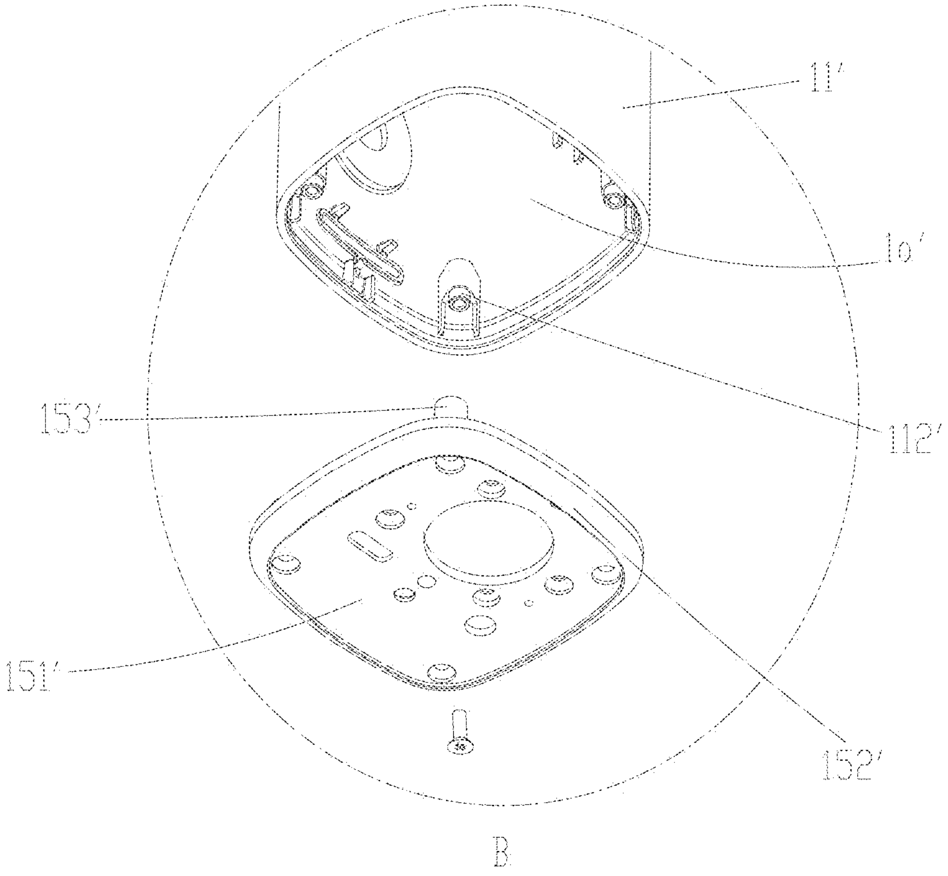
FIG. 23 is an enlarged view of part B of the microphone shown in FIG. 22.

Specifically, with reference to FIGS. 21 to 23, the bottom plate 15' includes a main body portion 151' and a connecting portion 152'. The connecting portion 152' is arranged along the periphery of the main body portion 151' and abuts against the outer shell 11'. The outer surface of the outer shell 11' and the outer surface of the connecting portion 152' collectively form a smooth curved surface. The light-emitting unit 41A is configured to allow emitted light to pass through the connecting portion 152'. In this embodiment, the outer surface of the connecting portion 152' and the outer surface of the outer shell 11' abut against each other to form either a continuous curved surface or a planar surface, thereby presenting the microphone 100' shell body as an integrated structure. The light emitted by the light-emitting unit 41A can transmit through the connecting portion 152', enabling the microphone 100' to provide bottom lighting effect that enhance visual perception for both users and audiences, consequently improving the product's entertainment value. The bottom plate 15' is fabricated from transparent materials including, but not limited to: glass, organic polymer light-transmissive materials (e.g., acrylic panels), light-transmissive composite materials, and transparent plastics, provided such materials achieve the required light transmission. In some other embodiments, the bottom plate 15' may include translucent materials such as: thermoplastic polymers, polymethyl methacrylate (PMMA), polyethylene (PE), polypropylene (PP), polyester (PET), polyvinyl chloride (PVC), polyamide (PA), cellulose acetate, polystyrene (PS), or polytetrafluoroethylene (PTFE), provided these materials achieve the desired translucency.

In this embodiment, the shell assembly 1' further includes a light shielding member 19'; the light shielding member 19' is arranged on the main body portion 151', and the light shielding member 19' is configured to shield the light emitted by the light-emitting unit 41A from being transmitted to the outside through the main body portion 151'. Specifically, the light shielding member 19' is arranged on the surface of the bottom plate 15' away from the cover plate 14', thereby shielding the light passing through the main body portion 151'. Using the light shielding member 19' to shield the main body portion 151' prevents the light from the light-emitting unit 41A from being transmitted through the main body portion 151'. This configuration facilitates assembly and production and improves production efficiency. In this embodiment, the light shielding member 19' additionally serve as a decorative element that conceals fastening components including screws and bolts, thereby enhancing product aesthetics. In other embodiments, the light shielding member 19' may also be arranged on the side of the cover plate 14' facing the first accommodating cavity 1*a'*. The light shielding member 19' may include either a light-blocking panel or a light-blocking coating.

In another embodiment, the main body portion 151' has light-shielding properties, while the connecting portion 152' has light transmittance. The main body portion 151' and the connecting portion 152' are made of materials with different light-transmissive characteristics. The light-shielding design of the main body portion 151' prevents the lighting effect from being displayed through the main body portion 151', allowing the lighting effect to be presented circumferentially around the connecting portion 152'. This results in a better visual effect in a nighttime environment.

Furthermore, the light-emitting assembly 4A includes a second circuit board 42A, the light-emitting unit 41A is electrically connected to the second circuit board 42A, and the second circuit board 42A is electrically connected to the first circuit board 31'; the second circuit board 42A is arranged in the first accommodating chamber 1*a'* adjacent to the bottom plate 15'. Specifically, the second circuit board 42A is arranged in parallel with the bottom plate 15'; the light-emitting unit 41A is arranged on a surface of the second circuit board 42A facing the bottom plate 15'. The second circuit board 42A has two oppositely arranged surfaces, which face the bottom plate 15' and the cover plate 14' respectively. The light-emitting unit 41A is arranged on the surface of the side of the second circuit board 42A facing the bottom plate 15'. The second circuit board 42A is electrically connected to the light-emitting unit 41A to enable individual control of the light-emitting unit 41A. This allows for a better display of lighting effects and also enables better control over the light-emitting unit 41A to present different lighting effects. The light-emitting unit 41A is arranged on the second circuit board 42A, allowing the emitted light to directly pass through the bottom plate 15' for a better lighting effect. In this embodiment, the first circuit board 31' is arranged vertically, while the bottom plate 15' and the second circuit board 42A are arranged horizontally. The second circuit board 42A is perpendicular to the first circuit board 31'. Specifically, the second circuit board 42A is annular and is arranged at the outer periphery of the first circuit board 31'. The light-emitting unit 41A consists of LED lamp beads. Multiple LED lamp beads are evenly distributed on the second circuit board 42A. Thus, when the light emitted by the LED lamp beads passes through the bottom plate 15', the displayed lighting effect is more uniform and the light effect is better.

In other embodiments, the light-emitting unit 41A may also be arranged between the second circuit board 42A and the bottom plate 15', provided that such configuration enables the light emitted by the light-emitting unit 41A to pass through the bottom plate 15'.

To facilitate the control of the activation and deactivation of the light-emitting unit 41A, the light-emitting assembly 4A further includes a switch button 45A penetrating through the bottom plate 15'. The switch button 45A is electrically connected to the first circuit board 31' to control the light-emitting unit 41A. The switch button 45A is configured to control the activation and deactivation of the light-emitting unit 41A, as well as adjust the color and blinking mode of the light source, thereby making the functions of the product more diverse and powerful.

Figure 24:
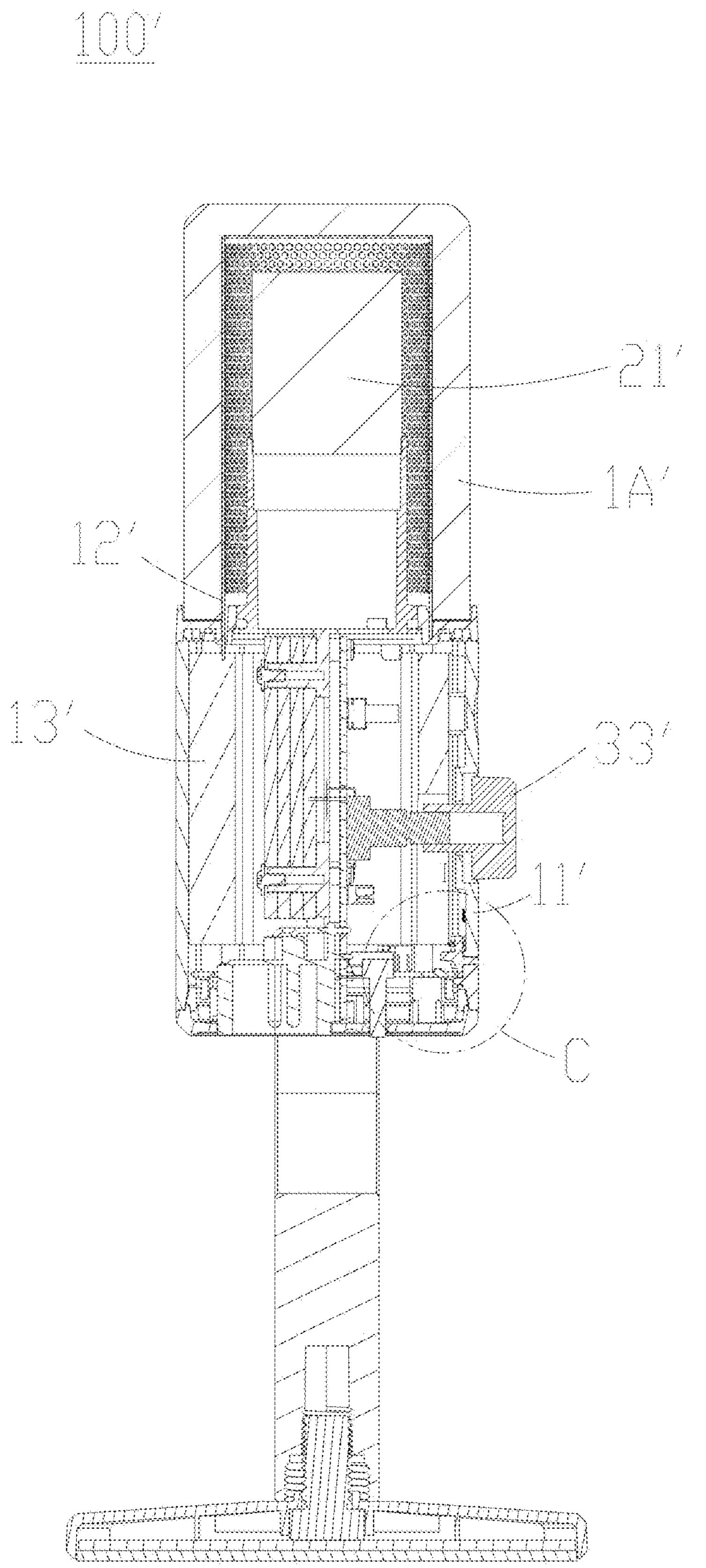
FIG. 24 is a cross-sectional diagram of the microphone shown in FIG. 18 along line XXIV-XXIV.
Figure 25:
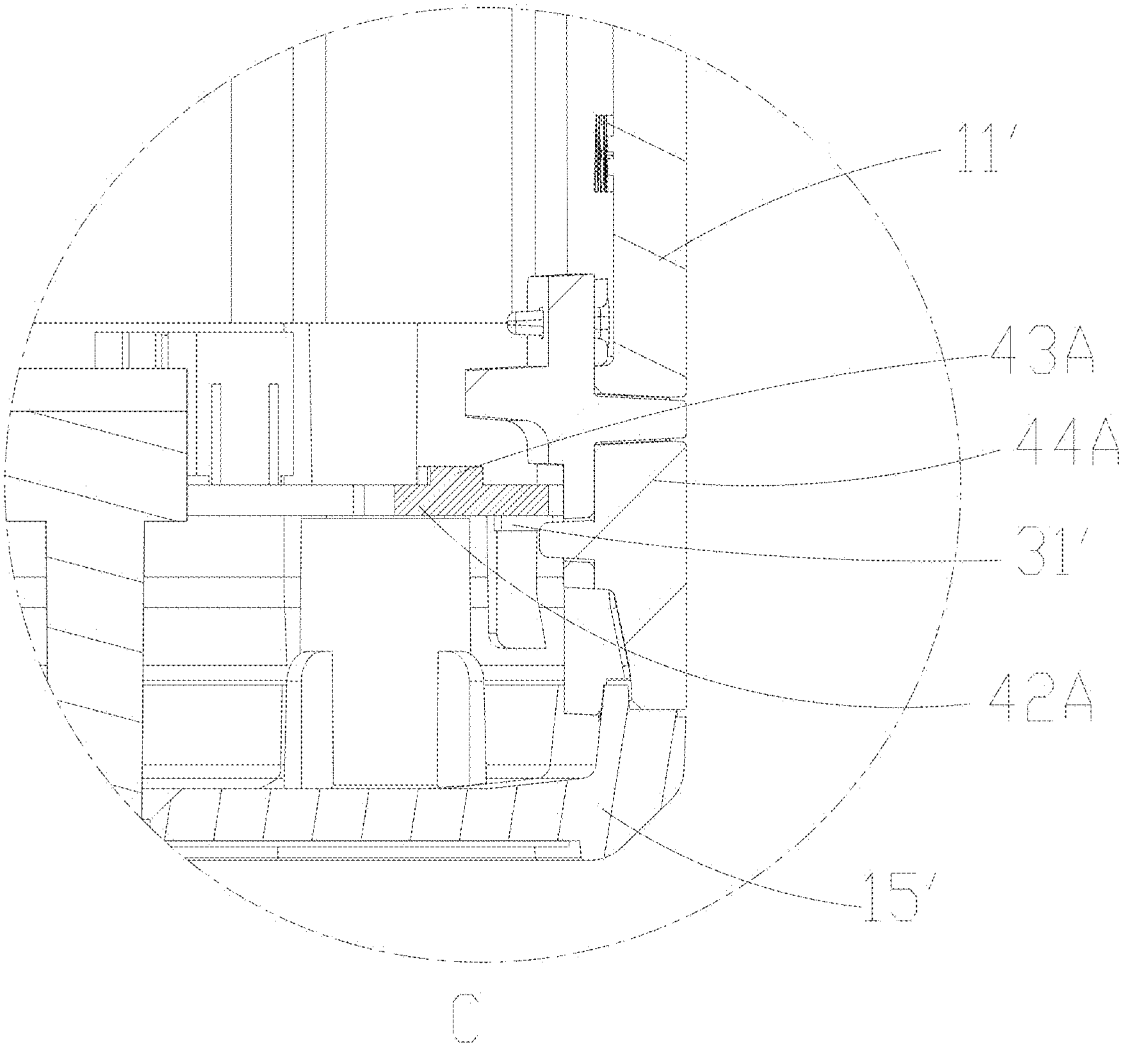
FIG. 25 is an enlarged view of part C of the microphone shown in FIG. 24.

In this embodiment, the light-emitting assembly 4A further includes an indicator lamp 43A and a light guide member 44A. The indicator lamp 43A is electrically connected to the second circuit board 42A, the indicator lamp 43A is configured to emit light, the light guide member 44A is configured to transmit the light emitted by the indicator lamp 43A to the outside of the outer shell 11'. Specifically, the outer shell 11' is provided with a through hole 11*a'*, a portion of the light guide member 44A is arranged in the through hole 11*a'*, the surface of the exposed portion of the light guide member 44A passing through the through hole 11*a'* is flush with the outer surface of the outer shell 11'. As shown in FIG. 24 and FIG. 25, in this embodiment, the indicator lamp 43A is arranged on the surface of the second circuit board 42A that faces the microphone head 21', so that the indicator lamp 43A and the light-emitting unit 41A are arranged on two opposite surfaces of the second circuit board 42A, thus avoiding the mutual interference of the light emitted by the two. The indicator lamp 43A is controlled by the second circuit board 42A, which results in a better control effect. Moreover, the light of the indicator lamp 43A is transmitted through the outer shell 11', and its lighting effect does not interfere with that of the bottom plate 15'. They can cooperate with each other and are convenient to distinguish. Arranging the light guide member 44A to guide the light emitted by the indicator lamp 43A to the outside of the outer shell 11' can enhance the indicating light effect.

To reinforce the support strength of the outer shell 11', the shell assembly 1' further includes an inner shell 13' arranged in the first accommodating chamber 1*a'* and connected to the outer shell 11'. The inner shell 13', which is a hollow cylindrical structure, is configured to abut against the outer shell 11' so as to enhance the support strength of the outer shell 11'. The inner shell 13' has light-shielding properties. The inner shell 13' is provided with a second accommodating chamber 13*a'*, and the first circuit board 31' is arranged in the second accommodating chamber 13*a'*. The second circuit board 42A is arranged on one end of the inner shell 13' adjacent to the bottom plate 15', the cover plate 14' is arranged on the other end of the inner shell 13'. The arrangement of the inner shell 13' to enhance the strength of the outer shell 11' improves the overall strength of the product. Moreover, it facilitates production and assembly, thereby increasing production efficiency. Meanwhile, the arrangement of the inner shell 13' also provides an additional layer of protection for the internal components, preventing the internal components from being affected when the outer shell 11' is externally impacted.

Figure 26:
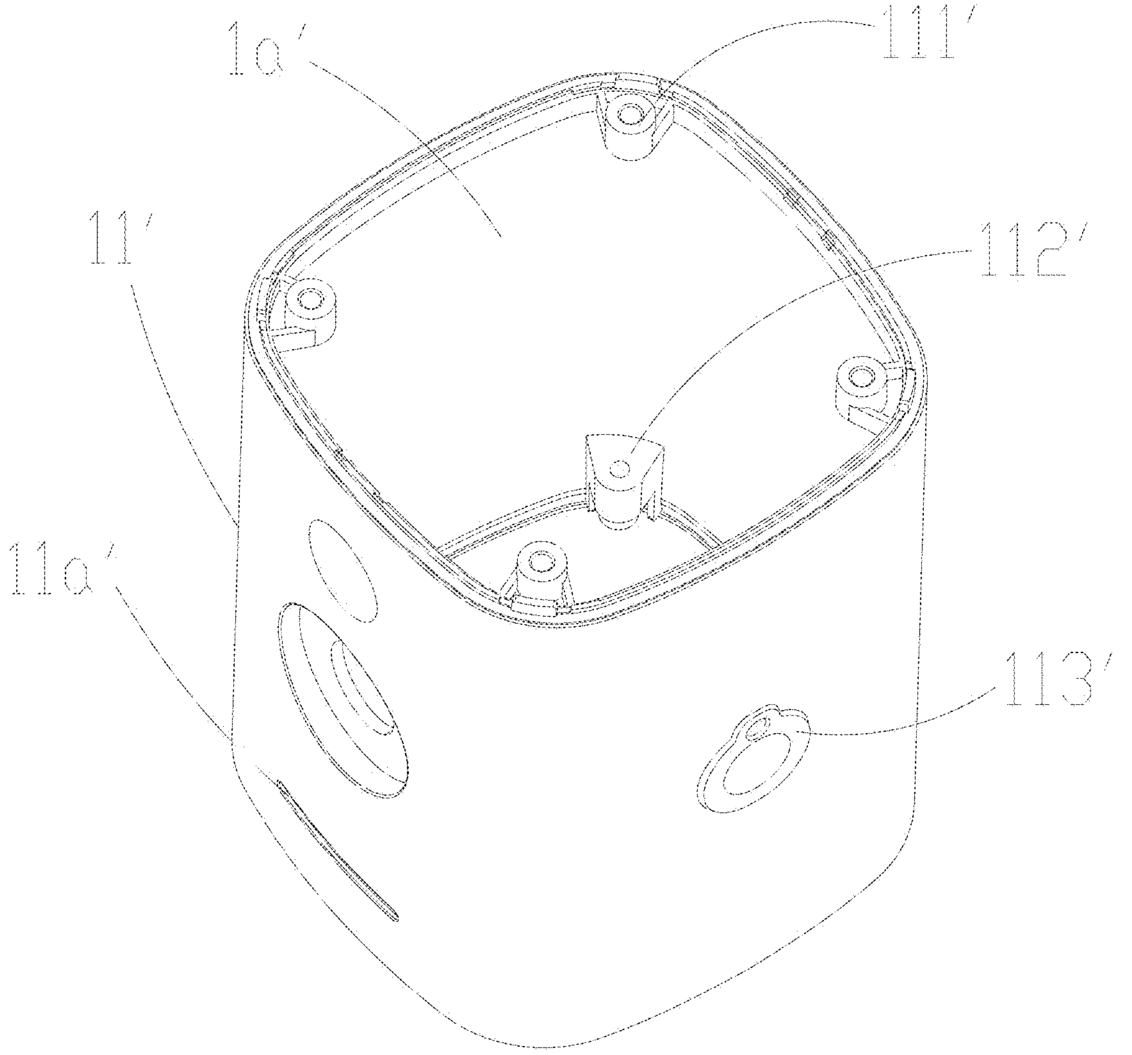
FIG. 26 is a three-dimensional diagram of the outer shell of the microphone shown in FIG. 18.

Referring to FIG. 21, FIG. 22 and FIG. 26, the outer shell 11' is provided with a first fixing portion 111' and a second fixing portion 112'. The first fixing portion 111' and the second fixing portion 112' both extend into the first accommodating chamber 1*a'*. Specifically, the number of the first fixing portions 111' and the second fixing portions 112' is four respectively, and they are evenly distributed at both ends of the outer shell 11'. The first fixing portion 111' and the second fixing portion 112' are provided with internal threads. The cover plate 14' is provided with a third fixing portion 141', and the bottom plate 15' is provided with a fourth fixing portion 153'. Specifically, the third fixing portion 141' and the fourth fixing portion 153' are provided with through holes 11*a*', and the through holes 11*a*' are arranged corresponding to the first fixing portion 111' and the second fixing portion 112' respectively. The shell assembly 1' further includes a plurality of fixing members 1B'. Specifically, the fixing members 1B' are screws. The first fixing portion 111' is connected to the third fixing portion 141' by screws, and the second fixing portion 112' is connected to the fourth fixing portion 153' by screws, so as to respectively cover the cover plate 14' and the bottom plate 15' on both ends of the outer shell 11'. In this embodiment, the light shielding member 19' can also cover components such as screws, making the product more aesthetically pleasing in appearance.

In the embodiment of the present disclosure, in order to facilitate the production and assembly of the microphone 100', the shell assembly 1' further includes a mounting frame 16' and a balancing weight 18'. The longitudinal direction of the mounting frame 16' is consistent with the longitudinal direction of the microphone 100'. The mounting frame 16' is arranged in the first accommodating chamber 1*a*', specifically, the mounting frame 16' is arranged in the second accommodating chamber 13*a*'. The balancing weight 18' and the first circuit board 31' are arranged on opposite sides of the mounting frame 16' and connected to the mounting frame 16'. The balancing weight 18' is configured to balance the weight of the shell assembly 1' so as to make the center of gravity of the microphone 100' positioned on the axis of the outer shell 11'. Specifically, the first circuit board 31' is connected to the mounting frame 16' by means of screw fixation. The balancing weight 18' is fixedly connected to the mounting frame 16' by screws. In other embodiments, other connection methods can also be adopted to realize the connection between the first circuit board 31' and the mounting frame 16'. The balancing weight 18' can also be connected to the mounting frame 16' by means of adhesive, buckle, or other fastening methods. The arrangement of the mounting frame 16' facilitates the production and assembly of various components. And the weight of the shell assembly 1' is adjusted and balanced by the balancing weight 18' to ensure that the center of gravity of the microphone 100' is positioned on the axis of the outer shell 11'. Thus, the stability of the microphone 100' is ensured when the microphone 100' is adjusted or rotated.

Specifically, one end of the mounting frame 16' extending along its longitudinal direction is connected to the bottom plate 15' screws, and the other end is connected to a mounting seat 12'. The mounting seat 12' is configured to mount the microphone head 21'. The shell assembly 1' further includes a partition plate 17'. The partition plate 17' is connected to the mounting seat 12' and the mounting frame 16', and the mounting seat 12' and the mounting frame 16' are arranged on two opposite sides of the partition plate 17'. The partition plate 17' is provided with a hole for a wire to pass through, and the wire is configured to be electrically connected to the microphone head 21' and the first circuit board 31'. By the arrangement of the partition plate 17', the positions of the mounting seat 12' and the mounting frame 16' are more obvious and easier to distinguish, so that efficient assembling can be achieved during assembling, and the production efficiency can be improved, thereby reducing the production cost of the product.

In this embodiment, the sound pickup assembly 2' further includes a mesh enclosure 22', and the mesh enclosure 22' covers the microphone head 21'. In this embodiment, the mesh enclosure 22' further covers the mounting seat 12' and abuts against the cover plate 14'. The shell assembly 1' further includes a sponge cover 1A'. The sponge cover 1A' is covered at the mesh enclosure 22' and abuts against the outer shell 11'. On the one hand, the sponge cover 1A' can effectively prevent popping noise, protect the microphone head 21' of the microphone 100', and prevent saliva splashing. On the other hand, an air flow of plosive directly blown to the microphone head 21' can be reduced, thereby prolonging the service life of the microphone 100' and enhancing the user experience.

In this embodiment, the sound pickup assembly 2' further includes a mesh enclosure 22', and the mesh enclosure 22' covers the microphone head 21'. In this embodiment, the mesh enclosure 22' further covers the mounting seat 12' and abuts against the cover plate 14'. The shell assembly 1' further includes a sponge cover 1A'. The sponge cover 1A' covers the mesh enclosure 22' and abuts against the outer shell 11'. On the one hand, the sponge cover 1A' can also effectively prevent popping caused by plosive sounds and prevent saliva from splashing into the microphone head 21' of the microphone 100'. On the other hand, the direct impact of the airflow of plosive sounds on the microphone head 21' can be reduced, thereby prolonging the service life of the microphone 100' and enhancing the user experience.

To facilitate user operation, the control assembly 3' further includes a function key. The function key is arranged in the outer shell 11' in a penetrating manner and is electrically connected to the first circuit board 31'. The function key penetrates the outer shell 11' and is disposed on the same side of the outer shell 11' as the through hole 11*a*'. The function key is configured to adjust the signal amplification level input to the microphone 100' or the signal strength output by it, and to enable or disable its mute function. The arrangement of the function key facilitates users to adjust and control the microphone 100'. Specifically, the function key further includes a function knob 33' and a mute button 34' configured to control the microphone 100' to be muted. Both the outer shell 11' and the inner shell 13' are provided with holes through which the function knob 33' and the mute button 34' can pass, so that the function knob 33' and the mute button 34' can be connected to the first circuit board 31' for users to operate. The mute button 34' can be pressed to mute the microphone 100' during use, and can be pressed again to relieve the mute effect. The operation is convenient. The function knob 33' has at least two functions. In this embodiment, two functions are taken as an example for introduction. During use, the first function is to adjust the gain effect of the microphone 100' by rotation, and the second function is to adjust the volume of earphones by rotation. The two functions can be switched by pressing the function knob 33'. In other embodiments, the function knob 33' may alternatively have a third function or more functions. The functions can be switched by pressing. The function knob integrates multiple function adjustments, so that the overall operation buttons of the product are reduced, and the appearance is neater and more beautiful.

The control assembly 3' further includes a first audio jack 35' arranged in the shell assembly 1' in a penetrating manner and connected to an external audio device, an earphone jack 36' for being connected to external earphones, and a second audio jack 37' for being connected to an external device to transmit data. The first audio jack 35', the earphone jack 36', and the second audio jack 37' are all electrically connected to the first circuit board 31'. Specifically, the first audio jack 35', the earphone jack 36', and the second audio jack 37' are all arranged in the bottom plate 15' in a penetrating manner. The bottom plate 15' is provided with corresponding holes. The first audio jack 35' is configured to be connected to another external device such as a sound card or an audio device, to achieve seamless compatibility. The second audio jack 37' is configured to be connected to another device, such as a computer or a tablet, to achieve data transmission such as audio data transmission. The two audio jacks enhance the functionality of the microphone 100', which is convenient for a user to use multiple interfaces. The main function of the earphone jack 36' is to be connected to the earphones for transmission of audio signals, thus allowing a user to listen to sound through the earphones. Specifically, the second audio jack 37' can be a USB interface or a type-c interface.

With continued reference to FIGS. 18 to 22, the microphone 100' further includes a base 5'. The connecting frame 6' is a unilateral support 6A'. The unilateral support 6A' includes a support 61' and a rotating shaft 62'. The rotating shaft 62' is arranged at one end of the support 61' away from the base 5'. One end of the support 61' is configured to be rotatably connected to the shell assembly 1' via the rotating shaft 62', and the other end is connected to the base 5'. The base 5' is configured to be placed on an external object to support the microphone 100'. Specifically, the outer shell 11' is provided with a mounting hole communicating with the first accommodating chamber 1*a*'. The rotating shaft 62' passes through the mounting hole, and the outer shell 11' is configured to be rotatably connected to the rotating shaft 62'. The support 61' is only connected to one side surface of the outer shell 11'. By adopting the unilateral support 6A', the area of the shell assembly 1' blocked by the support 61' can be reduced, and most of the area of the outer shell 11' can be redesigned and laid out, so that the appearance of the product is neater and more beautiful.

Figure 27:
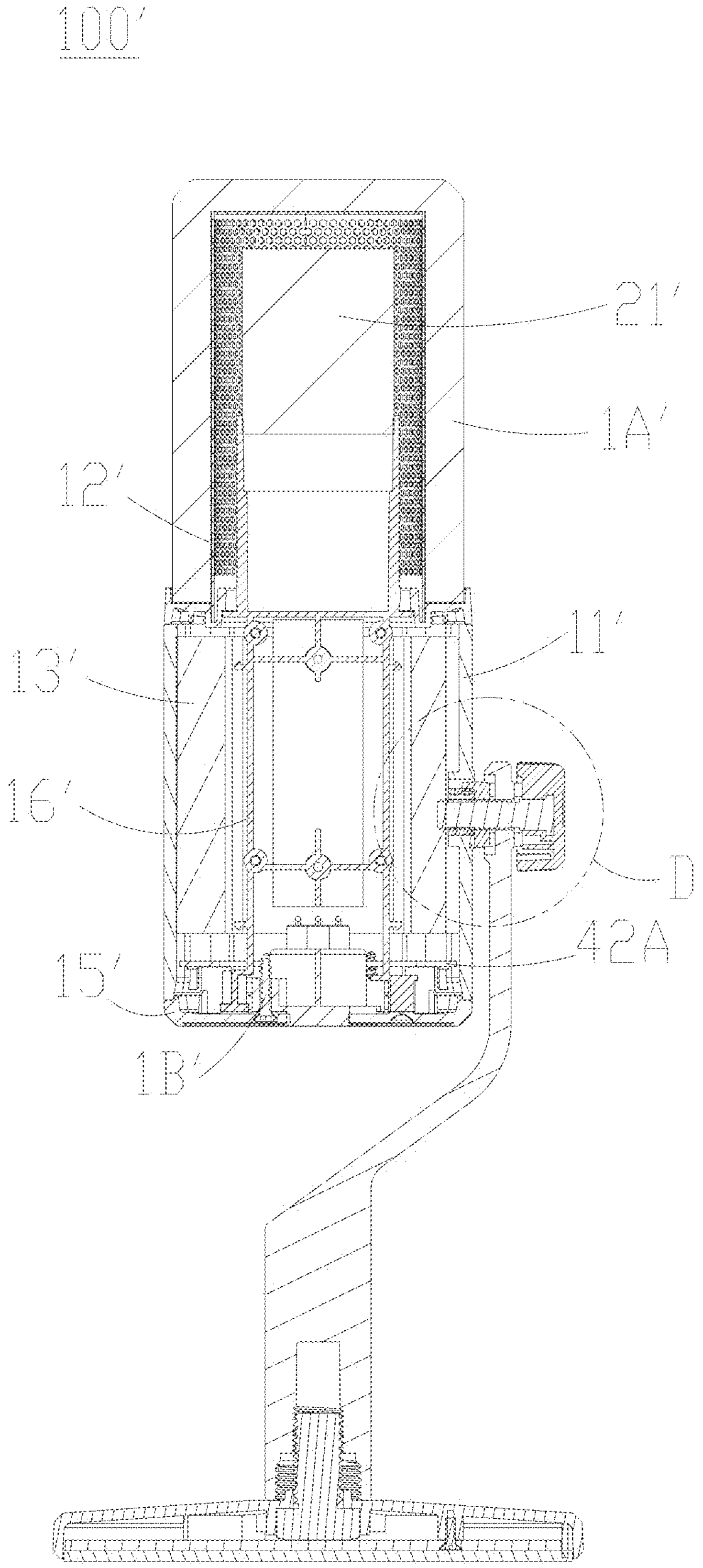
FIG. 27 is a cross-sectional diagram of the microphone shown in FIG. 18 along line XXVII-XXVII.
Figure 28:
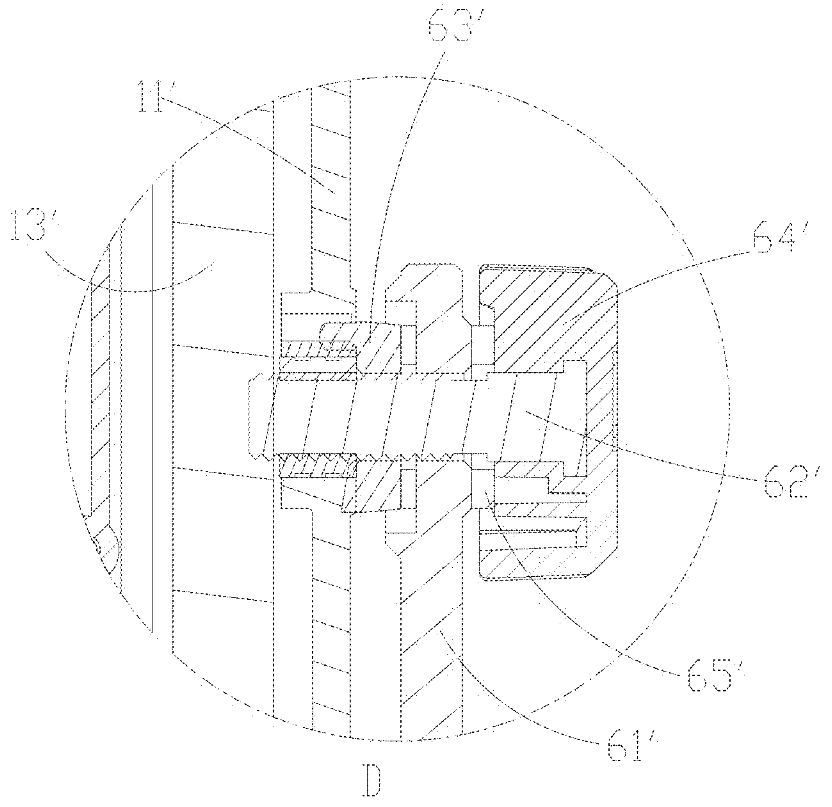
FIG. 28 is an enlarged view of part D of the microphone shown in FIG. 27.
Figure 29:
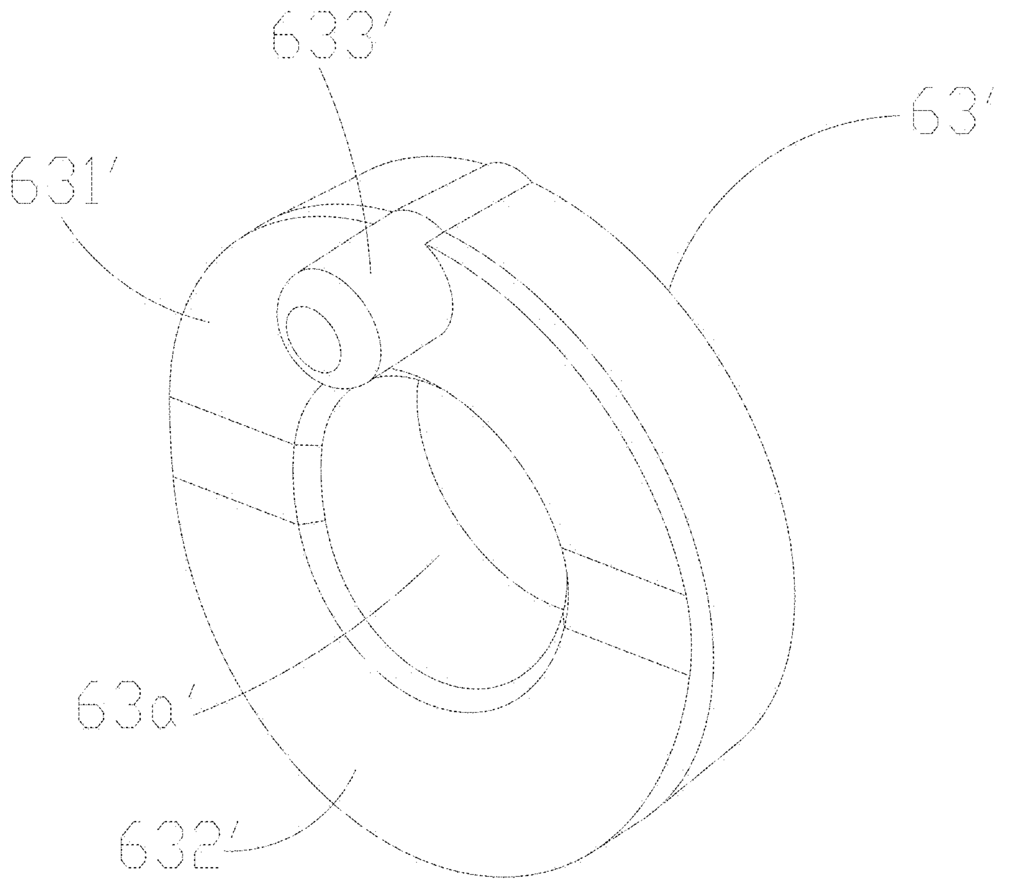
FIG. 29 is a three-dimensional diagram of the first gasket of the microphone shown in FIG. 17.

Specifically, referring to FIGS. 27 to 29, the unilateral support 6A' further includes a first gasket 63' with a through hole 63*a*'. The first gasket 63' is arranged between the outer shell 11' and the support 61', and the rotating shaft 62' passes through the through hole 63*a*'. The first gasket 63' includes a first portion 631' and a second portion 632'. The first portion 631' and the second portion 632' are arranged on opposite sides of the axis of the through hole 63*a*', and the thickness of the second portion 632' is greater than that of the first portion 631'. The second portion 632' is arranged at one end of the first gasket 63' adjacent to the base 5'. In this embodiment, the first gasket 63' is made of a soft material, such as silicone or rubber. The first gasket 63' can increase the contact area between the outer shell 11' and the support 61', so that the shell assembly 1' can maintain the desired angle after being rotationally adjusted for its tilt angle relative to the support 61'. The first gasket 63' is designed to be thinner at the top and thicker at the bottom, which plays a role in support compensation under the action of the gravity of the shell assembly 1' and the supporting force of the rotating shaft 62'. The thicker second portion 632' can better support the shell assembly 1'.

Since the shell assembly 1' is connected by the unilateral support 6A' and the microphone 100' has its own weight, it is likely to cause the shell to crack. In the embodiment of the present application, the microphone 100' further includes a shell compensation structure. The shell compensation structure is arranged on the shell assembly 1' and is configured to enhance the strength of the shell assembly 1'. The arrangement of the shell compensation structure ensures the strength of the connection between the shell assembly 1' and the support 61' and prevents the shell assembly 1' from cracking.

Specifically, the outer shell 11' is provided with a protrusion 113' configured to enhance the strength of the outer shell 11'. The protrusion 113' is annularly arranged around the mounting hole. The rotating shaft 62' passes through the mounting hole, and at least a portion of the first gasket 63' passes through the mounting hole. The inner shell 13' is also correspondingly provided with a hole for the rotating shaft 62' to pass through at a position corresponding to the mounting hole of the outer shell 11'. By arranging the protrusion 113' around the periphery of the mounting hole, it functions as a reinforcing rib to enhance the strength of the outer shell 11', thereby preventing cracking of the outer shell 11' and ensuring superior product quality. Meanwhile, the protrusion 113' protrudes out of the outer shell 11', so that a gap is reserved between the support 61' and the outer shell 11'. This enables the microphone 100' to have an avoidance space when it rotates or deflects due to an external force, thereby avoiding friction and collision between the outer shell 11' and the support 61', avoiding the damage to the outer shell 11', and ensuring the beautiful appearance of the microphone 100'.

The first gasket 63' is provided with a positioning column 633'. The positioning column 633' is located on the first portion 631' and faces the outer shell 11'. A positioning hole is provided at a corresponding position on the outer shell 11'. The positioning column 633' passes through the positioning hole. In this embodiment, the positioning column 633' is made of a soft material and abuts against the inner shell 13'. The positioning column 633' is arranged on the first gasket 63' and cooperates with the positioning hole on the outer shell 11'. This configuration can ensure that the relative positions of the first gasket 63' and the outer shell 11' are fixed, so that when the outer shell 11' rotates relative to the rotating shaft 62', the first gasket 63' rotates with the outer shell 11', thereby increasing the friction force during the rotation. This ensures that the shell assembly 1' can be maintained at an angle desired by the user without rotating, and improves the stability of the microphone 100'.

The unilateral support 6A' further includes a fastener 64'. The fastener 64' is connected to one end of the rotating shaft 62' away from the outer shell 11' and is located on one side of the support 61' away from the outer shell 11'. In this embodiment, the rotating shaft 62' is connected to the fastener 64' in a non-rotatable manner. The end of the rotating shaft 62' connected to the fastener 64' has a polygonal profile in axial view. A matching slot is provided in the fastener 64', so that the non-rotatable connection between the rotating shaft 62' and the fastener 64' is achieved. In other embodiments, the rotating shaft 62' can be fixedly connected to or integrally formed with the corresponding fastener 64'. The supporting assembly further includes a second gasket 65'. The second gasket 65' is arranged between the support 61' and the fastener 64'. By the arrangement of the fastener 64, the rotating shaft 62' passes through the support 61' to ensure the length of the rotating shaft 62' and also play a balancing role. The support 61' acts as a fulcrum, so that the shell assembly 1' and the fastener 64' are located at two ends of the rotating shaft 62', thereby balancing the weight of the shell assembly 1'. In addition, the fastener 64' can further ensure that the rotating shaft 62' will not fall off from the support 61'. The second gasket 65' can enlarge the contact area between the support 61' and the fastener 64', thereby achieving anti-slip and stabilizing effects.

Specifically, the support 61' includes a first connecting section 611', a second connecting section 612', and a third connecting section 613'. The first connecting section 611' and the third connecting section 613' may be substantially parallel but are not limited to being parallel. The second connecting section 612' connects the first connecting section 611' and the third connecting section 613', forming a certain angle with the first connecting section 611' and the third connecting section 613' respectively. The end of the first connecting section 611' away from the second connecting section 612' is connected to the base 5', while the end of the third connecting section 613' away from the second connecting section 612' is configured to be rotatably connected to the shell assembly 1'. The first connecting section 611' may be substantially perpendicular to the base 5', but it is not strictly limited to a perpendicular arrangement. With this configuration, the support 61' can more effectively support the microphone 100'.

In this embodiment, the support 61' is connected to the base 5' by a threaded connection. Specifically, an internal threaded hole is provided at one end of the support 61' connected to the base 5', and a bolt is in threaded connection with the internal threaded hole of the support 61' through the base 5'. In this embodiment, the base 5' can be detached from the support 61' by removing the bolt, enabling the microphone 100' to be connected to an external cantilever support through the internal threaded hole on the support 61'. Thus, the usage scenarios of the microphone 100' are expanded, allowing the microphone 100' to be used not only on the surface of an object, such as a desktop, but also suspended for use via the external cantilever support. The base 5' is provided so that the microphone 100' can be stably placed on the surface of an object. The shell assembly 1' can rotate relative to the support 61'. The rotatability of the shell assembly 1' makes it easier for users to adjust the inclination angle of the microphone 100', making it more convenient to use and enabling the microphone head 21' to pick up sounds more easily, thereby enhancing the user experience.

Figure 30:
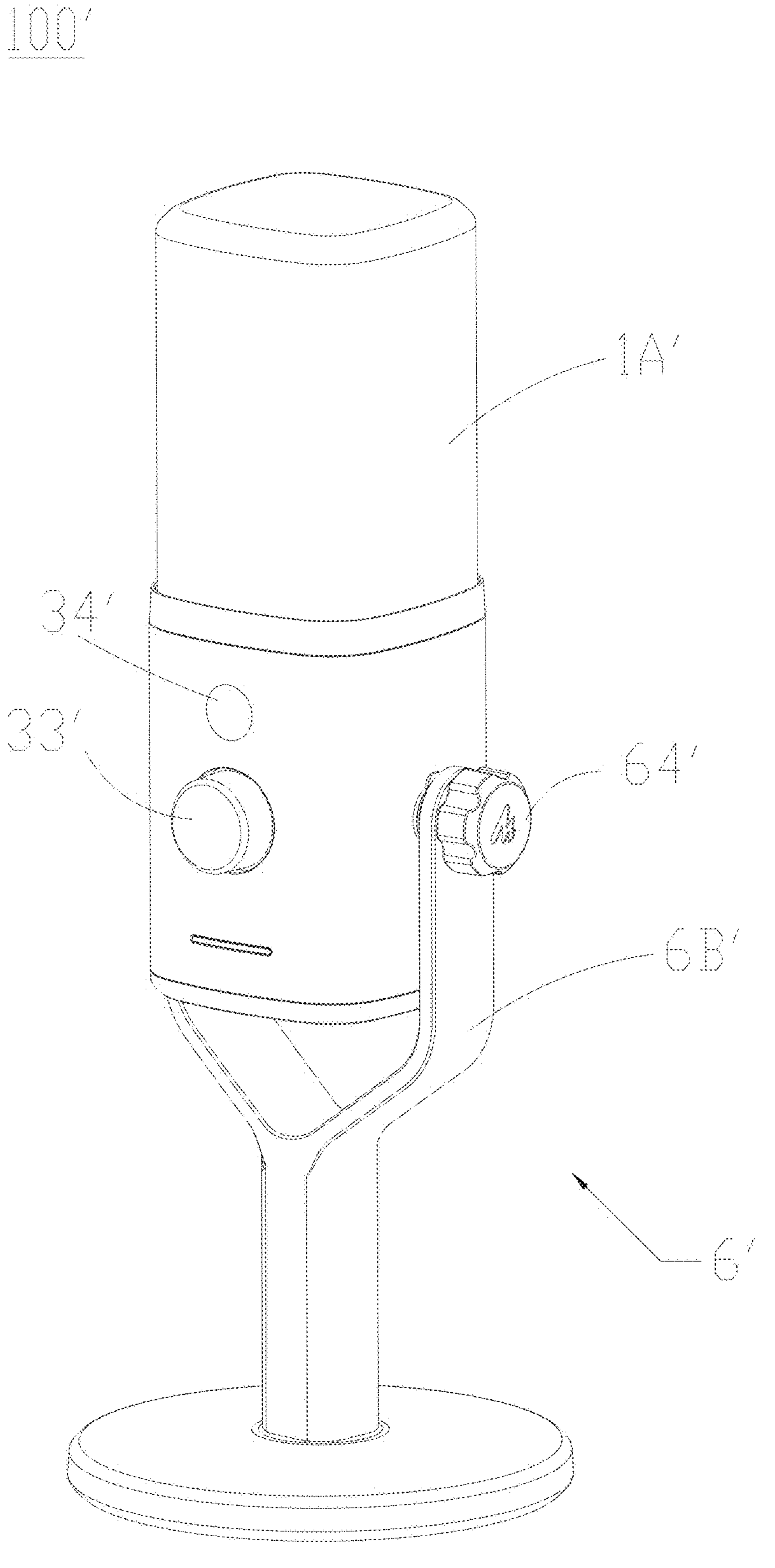
FIG. 30 is a three-dimensional diagram of a microphone according to another embodiment of this application.

Referring to FIG. 30, in another embodiment, the support 6' is a U-shaped support or a V-shaped support 6B'; both ends of the U-shaped support or the V-shaped support 6B' are configured to be rotatably connected to the shell assembly 1', and a bottom of the U-shaped support or the V-shaped support 6B' is configured to be connected to the base 5' to support the microphone 100' on an external object. The external object may be the base 5', or a cantilever. The bottom of the U-shaped support or the V-shaped support 6B' can be detachably connected to the base 5' or the cantilever, etc. by means of threaded connection.

The various technical features in the foregoing embodiments may be randomly combined. For concise description, not all possible combinations of the various technical features in the above embodiments are described. However, provided that combinations of these technical features do not conflict with each other, the combinations of the various technical features are considered as falling within the scope of this specification. The foregoing embodiments merely express several implementations of the present disclosure. The descriptions thereof are relatively specific and detailed, but are not understood as limitations on the scope of the present disclosure. A person of ordinary skill in the art can also make several transformations and improvements without departing from the idea of this application. These transformations and improvements fall within the protection scope of this application. Therefore, the protection scope of the patent of this application shall be subject to the appended claims.

What is claimed is:

1. A microphone, comprising:

a shell assembly, comprising a shell body with a first accommodating chamber;

a sound pickup assembly, comprising a microphone head for sound pickup, wherein the microphone head is arranged on the shell assembly;

a control assembly, comprising a first circuit board, wherein the first circuit board is arranged in the first accommodating chamber, and is electrically connected to the microphone head; and a light-emitting assembly, comprising a light-emitting unit, wherein the light-emitting unit is arranged in the first accommodating chamber and is electrically connected to the first circuit board; and the light-emitting unit is configured to allow emitted light to pass through a portion of the shell body, wherein the shell body comprises an outer shell having a circumferentially arranged sidewall structure and a bottom plate connected to one end of the sidewall structure; the first accommodating chamber is enclosed by the sidewall structure; at least one of the sidewall structure and the bottom plate has light transmittance, and is configured to allow light emitted by the light-emitting unit to pass through either the sidewall structure or the bottom plate.

2. The microphone according to claim 1, wherein the bottom plate comprises a main body portion and a connecting portion; the connecting portion is connected to an outer side of the main body portion and is connected to the outer shell; the connecting portion has light transmittance, and is configured to allow the light emitted by the light-emitting unit to pass through the connecting portion.

3. The microphone according to claim 2, wherein the main body portion has light-shielding properties or the shell assembly further comprises a light shielding member; the light shielding member is arranged on the main body portion, and the light shielding member is configured to shield the light emitted by the light-emitting unit from being transmitted to outside through the main body portion.

4. The microphone according to claim 2, wherein the connecting portion comprises an annular light-transmitting structure, and is configured to allow the light emitted by the light-emitting unit to pass through the connecting portion and form an annular light-emitting strip.

5. The microphone according to claim 2, wherein the shell assembly further comprises an inner shell arranged in the first accommodating chamber and connected to the outer shell; the inner shell is a hollow cylindrical structure configured to abut against the outer shell to reinforce support strength of the outer shell; the inner shell has light-shielding properties.

6. The microphone according to claim 1, wherein the shell assembly further comprises a cover plate connected to one side of the outer shell away from the bottom plate, and the cover plate has light-shielding properties.

7. The microphone according to claim 1, wherein the bottom plate has light-shielding properties; the outer shell has light transmittance, and is configured to allow the light emitted by the light-emitting unit to pass through the outer shell and allow the sidewall structure to emit light overall.

8. The microphone according to claim 7, wherein the shell assembly further comprises an inner shell arranged in the first accommodating chamber; the inner shell is provided with a second accommodating chamber; and the first circuit board is arranged in the second accommodating chamber; the inner shell has light transmittance; the light-emitting unit is arranged in the second accommodating chamber; and the light-emitting unit is configured to allow emitted light to sequentially pass through the inner shell and the outer shell.

9. The microphone according to claim 8, wherein an interval space is provided between the inner shell and the outer shell; the light-emitting unit is arranged in the inner shell or the interval space; the inner shell is a semi-transparent shell.

10. The microphone according to claim 2, wherein the light-emitting assembly comprises a second circuit board, the light-emitting unit is electrically connected to the second circuit board, and the second circuit board is electrically connected to the first circuit board; the second circuit board is arranged in the first accommodating chamber adjacent to the bottom plate, and the second circuit board is arranged in parallel with the bottom plate; the light-emitting unit is arranged on a surface of the second circuit board facing the bottom plate, and is configured to emit light toward the connecting portion.

11. The microphone according to claim 10, wherein the light-emitting assembly further comprises an indicator lamp, the indicator lamp is electrically connected to the second circuit board, and the indicator lamp is configured to allow emitted light to pass through the outer shell; the light-emitting assembly further comprises a light guide member, the outer shell is provided with a through hole, a portion of the light guide member is arranged in the through hole, the indicator lamp is arranged on a surface of the second circuit board facing the microphone head, the light guide member is arranged adjacent to the indicator lamp, and the light guide member is configured to transmit the light emitted by the indicator lamp to outside of the outer shell.

12. The microphone according to claim 11, wherein the control assembly further comprises a function key; the function key is configured to pass through the outer shell, is electrically connected to the first circuit board, and is disposed on a same side of the outer shell as the through hole; the function key is configured to adjust a signal amplification level input to the microphone and/or a signal strength output by the microphone, and/or to enable or disable a mute function of the microphone.

13. The microphone according to claim 1, wherein the microphone further comprises a base and a supporting assembly; the supporting assembly comprises a support; one end of the support is connected to the base; the shell body is configured to be rotatably connected to one end of the support away from the base, thereby enabling the shell assembly to rotate the sound pickup assembly relative to the base for adjusting a sound pickup angle.

14. The microphone according to claim 13, wherein one end of the support away from the base is rotatably connected to a side surface of the shell assembly.

15. The microphone according to claim 13, wherein one end of the support away from the base is rotatably connected to one end of the sidewall structure away from the bottom plate.

16. The microphone according to claim 13, wherein the microphone further comprises a shell compensation structure, the shell compensation structure is arranged on the shell assembly, and the shell compensation structure is configured to reinforce strength of the shell assembly; the supporting assembly further comprises a rotating shaft, the rotating shaft is arranged at one end of the support away from the base; the outer shell is provided with a mounting hole communicating with the first accommodating chamber, the rotating shaft is arranged in the mounting hole in a penetrating manner, the outer shell is configured to be rotatably connected to the rotating shaft; the shell compensation structure comprises a protrusion; and the protrusion is annularly arranged at the mounting hole and is connected to the outer shell; the supporting assembly further comprises a first gasket with a through hole, the first gasket is arranged between the outer shell and the support, the rotating shaft is arranged in the through hole in a penetrating manner; the first gasket comprises a first portion and a second portion, a portion adjacent to the base is defined as a second portion, and a thickness of the second portion is greater than a thickness of the first portion.

17. The microphone according to claim 13, wherein the support comprises a first connecting section, a second connecting section, and a third connecting section; the first connecting section is parallel to the third connecting section, the second connecting section is connected to the first connecting section and the third connecting section and forms a certain angle with the first connecting section and the third connecting section; one end of the first connecting section away from the second connecting section is connected to the base, and one end of the third connecting section away from the second connecting section is configured to be rotatably connected to the shell assembly; the first connecting section is connected to the base.

18. The microphone according to claim 13, wherein the support comprises a U-shaped support or a V-shaped support; both ends of the U-shaped support or the V-shaped support are configured to be rotatably connected to the shell assembly, and a bottom of the U-shaped support or the V-shaped support is configured to be connected to the base to support the microphone on an external object.

19. A microphone, comprising:

a shell assembly, comprising a shell body with a first accommodating chamber;

a sound pickup assembly, comprising a microphone head for sound pickup, wherein the microphone head is arranged on the shell assembly;

a control assembly, comprising a first circuit board, wherein the first circuit board is arranged in the first accommodating chamber, and is electrically connected to the microphone head; and a light-emitting assembly, comprising a light-emitting unit, wherein the light-emitting unit is arranged in the first accommodating chamber and is electrically connected to the first circuit board; and the light-emitting unit is configured to allow emitted light to pass through a portion of the shell body, the shell assembly further comprises a mounting frame and a balancing weight; a longitudinal direction of the mounting frame is consistent with a longitudinal direction of the microphone; the mounting frame is arranged in the first accommodating chamber; the balancing weight and the first circuit board are arranged on opposite sides of the mounting frame; the balancing weight is configured to balance a weight of the shell assembly for adjusting a center of gravity of the microphone.

* * * * *